(12) United States Patent
Subramanya

(10) Patent No.: US 9,415,721 B2
(45) Date of Patent: *Aug. 16, 2016

(54) DIRECTIONAL SPEED AND DISTANCE SENSOR

(71) Applicant: Balu Subramanya, Darnestown, MD (US)

(72) Inventor: Balu Subramanya, Darnestown, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 14/494,784

(22) Filed: Sep. 24, 2014

(65) Prior Publication Data

US 2015/0009049 A1 Jan. 8, 2015

Related U.S. Application Data

(63) Continuation of application No. 13/464,706, filed on May 4, 2012, now Pat. No. 8,878,697.

(60) Provisional application No. 61/638,173, filed on Apr. 25, 2012, provisional application No. 61/549,029, filed on Oct. 19, 2011.

(51) Int. Cl.
*B60Q 1/48* (2006.01)
*B60Q 9/00* (2006.01)
(Continued)

(52) U.S. Cl.
CPC ............ *B60Q 9/002* (2013.01); *G01S 7/2926* (2013.01); *G01S 7/2927* (2013.01); *G01S 7/40* (2013.01);
(Continued)

(58) Field of Classification Search
CPC ..... B60Q 9/002; G01S 7/2926; G01S 7/2927; G01S 7/40; G01S 13/00; G01S 13/12; G01S 13/931; G08G 1/09

USPC ........................................................ 340/932.2
See application file for complete search history.

(56) References Cited

U.S. PATENT DOCUMENTS 2,709,252 A 5/1955 Tasker
2,921,301 A 1/1960 Cartwright
(Continued)

FOREIGN PATENT DOCUMENTS

DE 199 49 737 4/2001
EP 1 048 960 11/2000
(Continued)

OTHER PUBLICATIONS

International Preliminary Report on Patentability and Written Opinion of the International Searching Authority for Application No. PCT/US2014/027263 dated Sep. 15, 2015.
(Continued)

*Primary Examiner* — Kerri McNally
(74) *Attorney, Agent, or Firm* — Hunton & Williams LLP

(57) ABSTRACT

A method of using a directional sensor for the purposes of detecting the presence of a vehicle or an object within a zone of interest on a roadway or in a parking space. The method comprises the following steps: transmitting a microwave transmit pulse of less than 5 feet; radiating the transmitted pulse by a directional antenna system; receiving received pulses by an adjustable receive window; integrating or combining signals from multiple received pulses; amplifying and filtering the integrated receive signal; digitizing the combined signal; comparing the digitized signal to at least one preset or dynamically computed threshold values to determine the presence or absence of an object in the field of view of the sensor; and providing at least one pulse generator with rise and fall times of less than 3 ns each and capable of generating pulses less than 10 ns in duration.

18 Claims, 30 Drawing Sheets

(51) Int. Cl.
*G01S 7/292* (2006.01)
*G01S 13/12* (2006.01)
*G01S 13/93* (2006.01)
*G01S 7/40* (2006.01)
*G01S 13/00* (2006.01)
*G08G 1/09* (2006.01)

(52) U.S. Cl.
CPC ............... *G01S 13/00* (2013.01); *G01S 13/12* (2013.01); *G01S 13/931* (2013.01); *G08G 1/09* (2013.01); *G01S 2013/936* (2013.01); *G01S 2013/9314* (2013.01); *G01S 2013/9339* (2013.01)

(56) References Cited

U.S. PATENT DOCUMENTS

| | | |
|---|---|---|
| 3,126,540 A | 3/1964 | Nilssen |
| 3,174,146 A | 3/1965 | Bossier et al. |
| 3,182,312 A | 5/1965 | Daniels |
| 3,241,106 A | 3/1966 | Du Vivier |
| 3,582,620 A | 6/1971 | Noetinger |
| 3,626,413 A | 12/1971 | Zachmann |
| 3,838,421 A | 9/1974 | Dasse-Hartaut et al. |
| 3,976,999 A | 8/1976 | Moore et al. |
| 4,167,735 A | 9/1979 | Lewis |
| 4,190,882 A | 2/1980 | Chevalier et al. |
| 4,227,195 A | 10/1980 | Salerno et al. |
| 4,620,192 A | 10/1986 | Collins |
| 4,901,083 A | 2/1990 | May et al. |
| 5,075,680 A | 12/1991 | Dabbs |
| 5,189,425 A | 2/1993 | Dabbs |
| 5,274,271 A | 12/1993 | McEwan |
| 5,337,082 A | 8/1994 | Fredericks |
| 5,345,471 A | 9/1994 | McEwan |
| 5,361,070 A | 11/1994 | McEwan |
| 5,374,932 A | 12/1994 | Wyschogrod et al. |
| 5,422,607 A | 6/1995 | McEwan |
| 5,457,394 A | 10/1995 | McEwan |
| 5,461,384 A | 10/1995 | Sieprath et al. |
| 5,465,094 A | 11/1995 | McEwan |
| 5,471,162 A | 11/1995 | McEwan |
| 5,479,120 A | 12/1995 | McEwan |
| 5,497,100 A | 3/1996 | Reiser et al. |
| 5,510,800 A | 4/1996 | McEwan |
| 5,512,834 A | 4/1996 | McEwan |
| 5,517,198 A | 5/1996 | McEwan |
| 5,519,342 A | 5/1996 | McEwan |
| 5,519,400 A | 5/1996 | McEwan |
| 5,519,618 A | 5/1996 | Kastner et al. |
| 5,521,600 A | 5/1996 | McEwan |
| 5,523,760 A | 6/1996 | McEwan |
| 5,563,605 A | 10/1996 | McEwan |
| 5,573,012 A | 11/1996 | McEwan |
| 5,576,627 A | 11/1996 | McEwan |
| 5,581,256 A | 12/1996 | McEwan |
| 5,589,838 A | 12/1996 | McEwan |
| 5,609,059 A | 3/1997 | McEwan |
| 5,661,490 A | 8/1997 | McEwan |
| 5,682,164 A | 10/1997 | McEwan |
| 5,686,921 A | 11/1997 | Okada et al. |
| 5,712,899 A | 1/1998 | Pace, II |
| 5,754,144 A | 5/1998 | McEwan |
| 5,757,320 A | 5/1998 | McEwan |
| 5,764,189 A | 6/1998 | Lohninger |
| 5,766,208 A | 6/1998 | McEwan |
| 5,767,953 A | 6/1998 | McEwan |
| 5,774,091 A | 6/1998 | McEwan |
| 5,804,921 A | 9/1998 | McEwan et al. |
| 5,805,110 A | 9/1998 | McEwan |
| 5,883,591 A | 3/1999 | McEwan |
| 5,966,090 A | 10/1999 | McEwan |
| 5,986,600 A | 11/1999 | McEwan |
| 6,031,421 A | 2/2000 | McEwan |
| 6,031,504 A | 2/2000 | McEwan |
| 6,055,287 A | 4/2000 | McEwan |
| 6,060,915 A | 5/2000 | McEwan |
| 6,072,427 A | 6/2000 | McEwan |
| 6,137,438 A | 10/2000 | McEwan |
| 6,191,724 B1 | 2/2001 | McEwan |
| 6,266,005 B1 | 7/2001 | Schneider |
| 6,278,965 B1 | 8/2001 | Glass et al. |
| 6,317,076 B1 | 11/2001 | Ameen et al. |
| 6,359,583 B1 | 3/2002 | Shamee |
| 6,373,428 B1 | 4/2002 | McEwan |
| 6,404,381 B1 | 6/2002 | Heide et al. |
| 6,414,627 B1 | 7/2002 | McEwan |
| 6,426,716 B1 | 7/2002 | McEwan |
| 6,452,467 B1 | 9/2002 | McEwan |
| 6,456,231 B1 | 9/2002 | McEwan |
| 6,462,697 B1 | 10/2002 | Klamer et al. |
| 6,462,705 B1 | 10/2002 | McEwan |
| 6,466,168 B1 | 10/2002 | McEwan |
| 6,486,825 B1 | 11/2002 | Smithey |
| 6,492,933 B1 | 12/2002 | McEwan |
| 6,531,977 B2 | 3/2003 | McEwan |
| 6,535,161 B1 | 3/2003 | McEwan |
| 6,600,103 B1 | 7/2003 | Schmidt et al. |
| 6,642,854 B2 | 11/2003 | McMaster |
| 6,644,114 B1 | 11/2003 | McEwan |
| 6,662,099 B2 | 12/2003 | Knaian et al. |
| 6,747,599 B2 | 6/2004 | McEwan |
| 6,750,787 B2 | 6/2004 | Hutchinson |
| 6,856,276 B2 | 2/2005 | Barrick et al. |
| 6,873,250 B2 | 3/2005 | Viana et al. |
| 6,888,494 B2 | 5/2005 | Tamatsu et al. |
| 6,909,396 B2 | 6/2005 | Haselsteiner et al. |
| 6,914,552 B1 | 7/2005 | McEwan |
| 7,057,550 B1 | 6/2006 | Aker |
| 7,068,210 B1 | 6/2006 | Mitra et al. |
| 7,148,791 B2 | 12/2006 | Grisham et al. |
| 7,180,428 B1 | 2/2007 | LeVan et al. |
| 7,187,321 B2 | 3/2007 | Watanabe et al. |
| 7,224,944 B2 | 5/2007 | McEwan |
| 7,271,761 B2 | 9/2007 | Natsume et al. |
| 7,345,623 B2 | 3/2008 | McEwan |
| 7,359,782 B2* | 4/2008 | Breed ............... B60R 21/0134 180/274 |
| 7,379,016 B1 | 5/2008 | McEwan |
| 7,391,339 B2 | 6/2008 | Howard et al. |
| 7,393,134 B2 | 7/2008 | Mitschele et al. |
| 7,446,695 B2 | 11/2008 | McEwan |
| 7,446,699 B2 | 11/2008 | McEwan |
| 7,489,265 B2 | 2/2009 | Egri et al. |
| 7,508,337 B2 | 3/2009 | Morinaga et al. |
| 7,551,703 B2 | 6/2009 | McEwan |
| 7,573,400 B2 | 8/2009 | Arnold et al. |
| 7,592,944 B2 | 9/2009 | Fullerton et al. |
| 7,675,455 B2 | 3/2010 | Hatono |
| 7,786,927 B2 | 8/2010 | Kondoh |
| 7,812,760 B2 | 10/2010 | Teshirogi et al. |
| 7,817,080 B2 | 10/2010 | Aoyagi et al. |
| 7,854,310 B2 | 12/2010 | King et al. |
| 7,864,100 B2 | 1/2011 | McEwan |
| 7,868,784 B2 | 1/2011 | Kuo et al. |
| 7,889,118 B1 | 2/2011 | Finley et al. |
| 7,952,515 B2 | 5/2011 | McEwan |
| 7,994,968 B2 | 8/2011 | McEwan |
| 8,115,673 B1 | 2/2012 | McEwan |
| 8,164,508 B2* | 4/2012 | Merli ............... G01S 7/2927 340/436 |
| 8,264,401 B1 | 9/2012 | Kavaler |
| 8,466,831 B2 | 6/2013 | Pierno et al. |
| 8,595,054 B2 | 11/2013 | King et al. |
| 2002/0072964 A1 | 6/2002 | Choi |
| 2002/0189336 A1 | 12/2002 | McEwan |
| 2003/0025626 A1 | 2/2003 | McEwan |
| 2003/0071754 A1 | 4/2003 | McEwan |
| 2004/0168512 A1 | 9/2004 | McEwan |
| 2005/0164643 A1 | 7/2005 | McEwan |
| 2005/0262081 A1 | 11/2005 | Newman |
| 2006/0074546 A1 | 4/2006 | DeKock et al. |
| 2006/0125683 A1 | 6/2006 | Steinbuch |
| 2006/0136131 A1 | 6/2006 | Dugan et al. |

(56) References Cited

U.S. PATENT DOCUMENTS

| | | |
|---|---|---|
| 2006/0152349 A1 | 7/2006 | Ratnakar |
| 2006/0170587 A1 | 8/2006 | Kai |
| 2006/0212344 A1 | 9/2006 | Marcus et al. |
| 2007/0024488 A1 | 2/2007 | Zemany et al. |
| 2007/0159378 A1 | 7/2007 | Powers et al. |
| 2007/0177704 A1 | 8/2007 | McEwan |
| 2007/0192391 A1 | 8/2007 | McEwan |
| 2007/0195373 A1 | 8/2007 | Singh |
| 2007/0200749 A1 | 8/2007 | McEwan |
| 2007/0210935 A1 | 9/2007 | Yost et al. |
| 2007/0210955 A1 | 9/2007 | McEwan |
| 2007/0276600 A1 | 11/2007 | King et al. |
| 2008/0048905 A1 | 2/2008 | McEwan |
| 2008/0770327 | 3/2008 | Harris |
| 2008/0158010 A1 | 7/2008 | Nath et al. |
| 2008/0319837 A1 | 12/2008 | Mitschele |
| 2009/0033539 A1 | 2/2009 | Zemany |
| 2009/0051581 A1 | 2/2009 | Hatono |
| 2009/0135044 A1 | 5/2009 | Sutphin |
| 2009/0303100 A1 | 12/2009 | Zemany |
| 2010/0073221 A1 | 3/2010 | McEwan |
| 2010/0214157 A1 | 8/2010 | McEwan |
| 2010/0214158 A1 | 8/2010 | McEwan |
| 2010/0245161 A1 | 9/2010 | Spreadbury |
| 2010/0265118 A1 | 10/2010 | Merli et al. |
| 2010/0274446 A1 | 10/2010 | Sasajima et al. |
| 2011/0102197 A1 | 5/2011 | Herwich |
| 2011/0205087 A1 | 8/2011 | Kell et al. |
| 2011/0221624 A1 | 9/2011 | Kavaler |
| 2011/0241857 A1 * | 10/2011 | Brandenburger ....... G01S 15/87 340/435 |
| 2012/0065858 A1 | 3/2012 | Nickolaou et al. |
| 2012/0095812 A1 | 4/2012 | Stefik et al. |
| 2012/0285790 A1 | 11/2012 | Jones et al. |
| 2013/0099943 A1 | 4/2013 | Subramanya |
| 2013/0176161 A1 | 7/2013 | Derham et al. |

FOREIGN PATENT DOCUMENTS

| | | |
|---|---|---|
| EP | 2 237 062 | 10/2010 |
| JP | 01035699 | 2/1989 |
| JP | 09-228679 | 9/1997 |
| JP | 2007-101490 | 4/2007 |
| KR | 10-0472080 | 3/2005 |
| WO | WO 01/42904 | 6/2001 |
| WO | WO 2007/122873 | 11/2007 |

OTHER PUBLICATIONS

International Search Report and the Written Opinion of the International Searching Authority for Application No. PCT/US2014/027263 dated Sep. 29, 2014.

Arora, "A line in the sand: a wireless sensor network for target detection, classification, and tracking," Computer Networks 46 (2004), pp. 605-634.

Ditzel, "Low-power Radar for Wireless Sensor Networks," Proceedings of the 3rd European Radar Conference, Manchester UK, Sep. 2006, pp. 139-141.

Dutta et al. "Towards Radar-Enabled Sensor Networks," IPSN '06, Apr. 19-21, 2006, Nashville, TN.

McEwan and Brase, "Ultra-Wideband Radar Imaging," Lawrence Livermore National Library Lab-Wide Report 1991.

McEwan and Hanks, "High voltage picosecond pulse generation using avalanche diodes," SPIE vol. 1346 Ultrahigh- and High-Speed Photography, Videography, Photonics, and Velocimetry '90, pp. 465-470.

McEwan Technologies 24 GHz Pulse Echo Radar Model PER-24.
McEwan Technologies 24 GHz Radar RangeFinder Model RRF24.
McEwan Technologies 4-Zone Field Disturbance Sensor Motion Sensor Model FDS.
McEwan Technologies Micropower Impulse Radar (MIR), Science & Technology Review, Jan./Feb. 1996, pp. 17-29.
McEwan Technologies Micropower Motion Sensor Model uP-DPD.
McEwan Technologies Narrow Beam 24 GHz Motion Sensor Model PD-24.
McEwan Technologies Pulse Echo Radar Model RFF24S Radar Rangefinder.
McEwan Technologies Pulse-Echo Radar RangeFinder Model RRF58.
McEwan Technologies Single Zone Motion Sensor Model DPD.
McEwan, "World's Fastest Solid-State Digitizer," Energy and Technology Review, Apr. 1994, University of California, Lawrence Livermore National Laboratory.
International Preliminary Examination Report and Written Opinion for Application No. PCT/US2012/036615 dated May 1, 2014.

* cited by examiner

Fig. 5
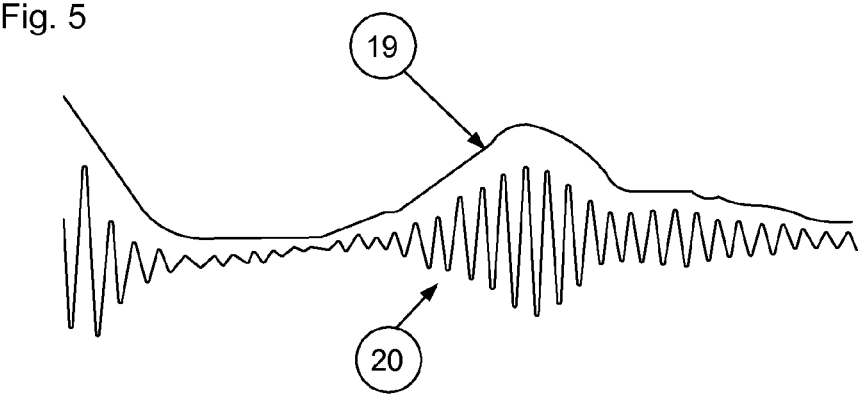
Fig. 6
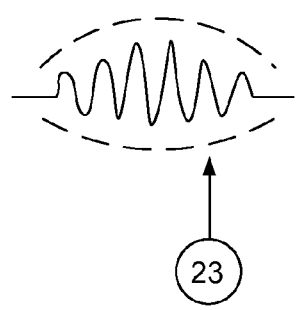
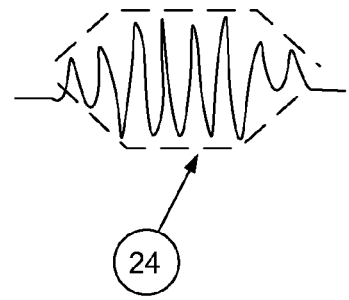

Phase variation due to Vehicle movement

Wired Example

Tx Pulse Frequency Modulation

Plurality of antenna elements

Plurality of antenna elements

Fig. 40
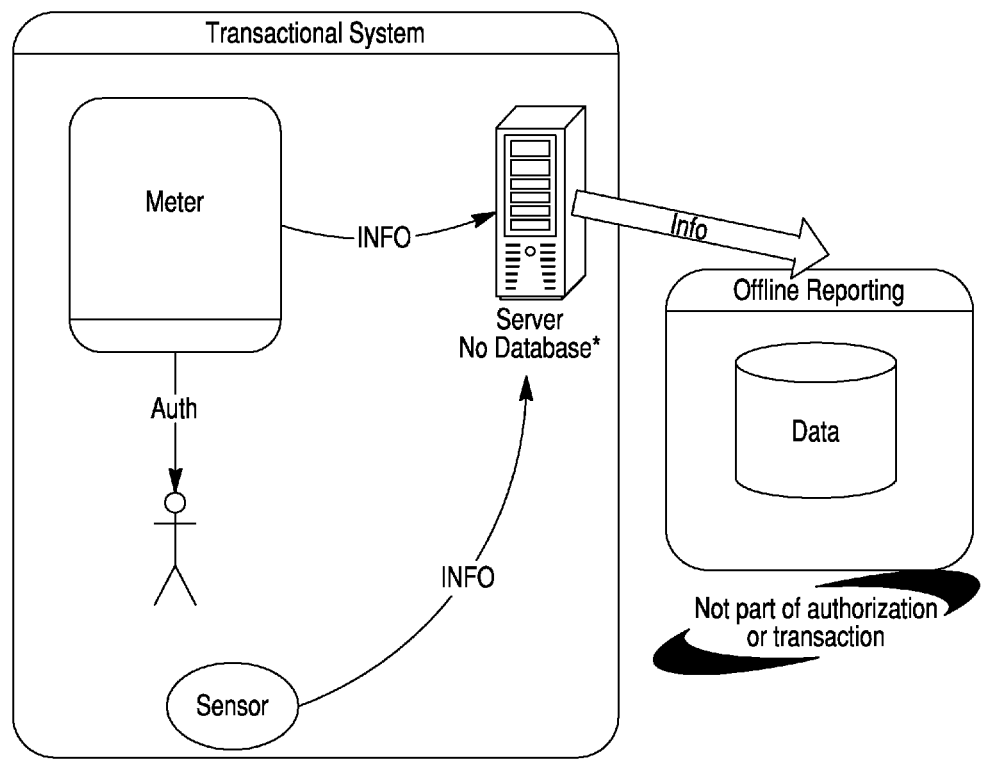
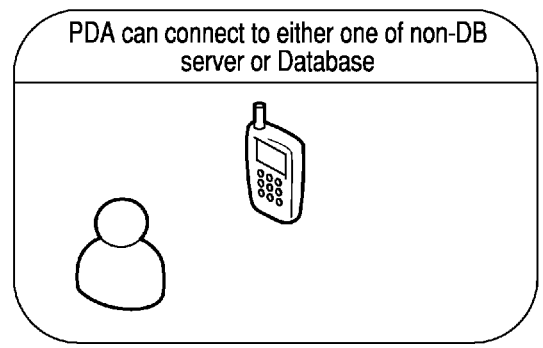

DIRECTIONAL SPEED AND DISTANCE SENSOR

CROSS-REFERENCE TO RELATED APPLICATIONS

This application is a continuation of U.S. patent application Ser. No. 13/464,706 filed May 4, 2012, which claims priority to and the benefit of U.S. Provisional Application Ser. Nos. 61/549,029 filed Oct. 19, 2011 and 61/638,173 filed Apr. 25, 2012. The disclosures of these priority applications are hereby incorporated herein by reference in their entirety.

FIELD OF THE INVENTION

What is described is a directional speed and distance measurement sensor based on a time of flight ranging technique that can be used to detect objects in a zone of interest such as automobiles near an intersection stop bar, access control device, or a parking space. The sensor can also act as a transponder and can be combined with in-vehicle devices and other transponders and can be deployed as a network.

BACKGROUND OF THE INVENTION

The use of time-of-flight technology in the field of slow moving vehicles or persons in a narrow and defined zone of interest in close proximity to the sensor is not common. Light travels at slightly less than 1 foot per nanosecond in air. When ranging short distances, such as those required when detecting vehicles in a parking space or adjacent to a traffic signal stop bar, the pulse width needs to be very short, otherwise there will not be a separation between the transmit pulse and receive pulse. For example, aircraft radar's pulse widths tend to be in the microseconds range and they do not work for nearby objects, such as when the planes are low overhead.

If used in a time-of-flight mode, parking sensors need to have a transmit pulse of typically 1-3 nanoseconds duration to have adequate separation between transmit and receive windows. At these pulse widths, the emitted spectrum becomes very broad up to or above 1 GHz.

There is not a greater than 1 GHz block of spectrum anywhere that regulatory agencies like the FCC allocate for such purposes as spectrum is a very valuable resource. At some extremely high frequencies (>60 GHz), there are blocks of spectrum potentially large enough, but they are difficult to use economically with present technologies.

There is a however a "general class" spectrum, under FCC Part 15 (15.209) between intended for such low emissions that there is no possible interference to anyone else. This requires emitters to emit about one trillionth of power of a cell phone. This has been used primarily for emitters that emit inside a closed metal tank (where outside the tank the emissions meet the spec).

The need exists for a sensor using time of flight radar that passes stringent regulatory FCC frequency limits for the first time to detect movement in short distances or close proximities.

SUMMARY OF THE INVENTION

The described invention is better suited for certain measurements, especially using a battery operated device to detect and measure objects such as automobiles or persons that can either be moving or stationary. Other sensing technologies exist, such as Doppler techniques with Radar, Laser, or Ultrasound, Frequency Modulated Continuous Wave techniques with Radar, Laser, Infrared, or Ultrasound, Time of flight ranging with Ultrasound, etc., but these techniques do not lend themselves well to situations that have slow or stationery objects and in outdoor environments. True time-of-flight ranging with radar or laser has been not possible until now to adapt for these measurements due to the proximity of the object being sensed, which imposes extremely tight tolerances for the transmit pulse and receive windows and the difficulties in separating the transmit burst from the received signal. The present invention discloses techniques that make it possible for a time-of-flight ranging sensor to be used for detection and measurement of properties of objects such as automobiles in a defined zone of interest, especially in outdoor environments such as a parking space or roadway. For many applications, narrowly defining a zone of interest and being able to discriminate whether an object is present within that zone and measure its properties is important. For example, in a Red Light Camera application, being able to photograph a vehicle at a consistent position, immediately upstream of and very close to the stop bar is critical to ensure consistent image capture and to maximize the violation capture rates; for a parking application, it is important that marked boundary of the parking be treated as a hard zone edge and that objects within the parking space are detected reliably and objects outside are excluded reliably; at a lane access control point, it is important that the vehicle's back or front be detected in a precise spot each time, so that the camera can capture the license plate reliably.

There is also a significant need in many applications to uniquely identify a vehicle at a parking space or an access control point. For example, this information can be used to provide discounts, preferential treatment of vehicles, or to apply different enforcement or business rules. One elegant, economical, and effective way of accomplishing this is to combine the sensor's low power transmission with data and achieve one way or two communications with a compatible in-vehicle device. The disclosed invention makes this possible by combining a range of disclosed features including low power transmissions that are repeated frequently, highly localized transmissions in the zone of interest, techniques that use the transmission and reception capabilities in the radar to also communicate low data rate information such as an unique vehicle identification, and techniques that enables the sensor to distinguish between target object radar signatures from transmissions from the in-vehicle devices. The disclosed techniques also make it possible for very low powered in-vehicle devices that can operate on small battery or solar power.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, wherein:

FIG. 5 shows an illustration of a video output if the receive windows timing is continually swept in relation to the transmit for a fixed object and its envelope.

FIG. 6 shows examples of transmit bursts.

FIGS. 38 and 40 show the sensor unit detached from the payment system and communicating with a server system.

DETAILED DESCRIPTION OF THE PREFERRED EMBODIMENT

Figure 1:
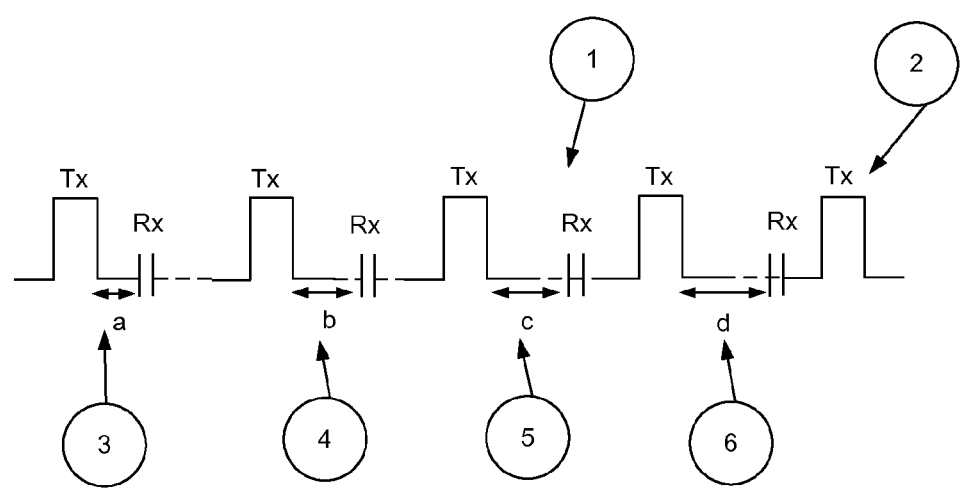
FIG. 1 shows a representation transmit pulses and the receive windows.

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. The word "a" as used in the claims means "at least one" and the word "two" as used in the claims means "at least two".

A true time-of-flight radar essentially transmits a pulse of a radio frequency carrier wave using a transmit antenna and then waits for a receive echo and measures the time between the transmit (Tx) and receive (Rx) pulses.

Time of flight Radar and Laser ranging technology is extensively used for a variety of applications, including the detection and range measurement of airborne or sea surface objects, distance measurement from space, etc. When used for relatively distant objects, measurement errors caused by the transmit pulse duration, receive burst timing errors, etc., are not significant and the transmit burst can be of a long enough duration to contain the spectral width of the transmission within a relatively small range. However, ranging with objects at a short distance, say less than 20 feet, places significant limitations on the measurement techniques that are not easily overcome.

There is a significant need for reliable, short distance measurements of objects such as automobiles or persons within a small and defined zone of interest for a variety of applications. For example, in a Red Light Camera application, being able to photograph a vehicle at a consistent position, immediately upstream of and very close to the stop bar is critical to ensure consistent image capture and to maximize the violation capture rates; for a parking application, it is important that marked boundary of the parking be treated as a hard zone edge and that objects within the parking space are detected reliably and objects outside are excluded reliably; at a lane or driveway access control point, it is important that the vehicle's back or front be detected in a precise spot each time, so that the camera can capture the license plate reliably.

Doppler techniques using radar or infrared laser can be very accurate for measurement of velocity and are widely used in speed radar applications, but are unable to detect a slow moving or stationery vehicle or object. Magnetic flux measurements are often used to determine the presence or absence of a vehicle in a parking spot, but these suffer from lack of spatial resolution as the measurement area cannot be tightly constrained within a defined space and these cannot work with objects with small or no ferrous content. Magnetic induction techniques require considerable power to operate and are not suitable for battery operated areas, such as a remote installation, a roadside installation, or in any areas where electric grid supply is not available or not economically feasible. Frequency modulated continuous wave ranging techniques using infrared laser and radar suffer from the inability to differentiate spurious reflections and clutter from reflections from the target object. Ultrasound techniques suffer from inaccuracies due to changes in ambient air density and interference from ambient noise sources. Thermal imaging techniques suffer if the object is not guaranteed to have a thermal signature, such a car that is parked for a length of time and has cooled down to the surrounding temperature or a heavily clothed person not exposing any warm skin. Visual imaging suffers from processing complexity and interference from changing ambient lighting conditions and extraneous light sources.

The disclosed invention uses techniques that make it possible for true time of flight ranging to be used for detection and measurement of objects such as automobiles from short distances. Many challenges in time of flight ranging need to be overcome to fit this purpose, which is accomplished by this invention.

Radio waves and infrared light travel in air at close to the speed of light in vacuum, i.e., slightly less than 1 foot per nanosecond. By the time these waves to hit and reflect off the object to be measured at its closest range, the transmit burst should be completely silenced and the device needs to be ready to listen for the reflected signal in the receive mode. Since the waves travel the path from a sensor to the target and back, they travel twice the ranging distance which can be approximated to one foot of measured distance per two nanoseconds. This factor establishes the minimum pulse width of the transmit pulse and the tradeoffs involved between near object measurement and pulse length. In practice however, the transmit pulse needs to be quite smaller than the minimum range to be measured to provide for a sufficient gap between the transmit burst and receive window as well as to ensure adequate range resolution.

There are however some rare exceptions to this such as when a large target is in close proximity and a reflecting object on the other side of the sensor and the waves from the transmit burst are made to bounce back and forth repeatedly and effectively behave like a longer range measurement that would tolerate a longer transmit burst.

There is however, one embodiment of the present invention that uses a different technique for targets that are extremely close to the sensor. In this embodiment, the transmit and receive windows overlap or a single window is used, for example, with a regenerative detector. Since the phase of the received signal is uncontrolled with respect to the transmit, there is a chance that the received signal would work to cancel the transmit and prevent detection of the object. In the disclosed embodiment, this problem is overcome by either using a plurality of radiating elements so that a plurality of distances to the target object can be measured or to modulate the transmit pulse using frequency or phase modulation.

FIG. 1 shows a representation transmit pulses 2 and the receive windows. In practice, a large number of transmit pulses are sent and the receive windows adjusted or swept in relation to the transmit pulse. The receive window timing shown by a, b, c and d (3, 4, 5, and 6 respectively). In the illustration, the change in the receive window timing with respect to the transmit pulse is shown with 3, 4, 5, and 6 of different magnitudes.

Figure 2:
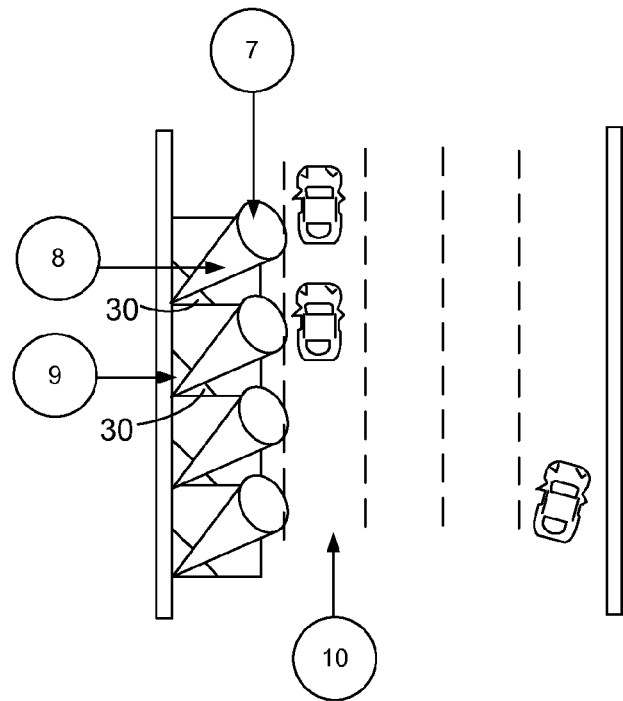
FIG. 2 shows as example deployment in a roadside parking or moving vehicle application.

FIG. 2 shows as example deployment of a directional sensor 30 according to the present invention (referred to hereinafter as "sensor") in a roadside parking or moving vehicle application. Element 10 denotes a parking lane and 8 and 9 are sensor locations. Element 7 shows a representation of a bubble in the zone of interest. It will be appreciated that the directional sensor 30 of the present invention is provided for the purposes of detecting the presence of a vehicle or an object within a zone of interest on a roadway or in a parking space.

Figure 3:
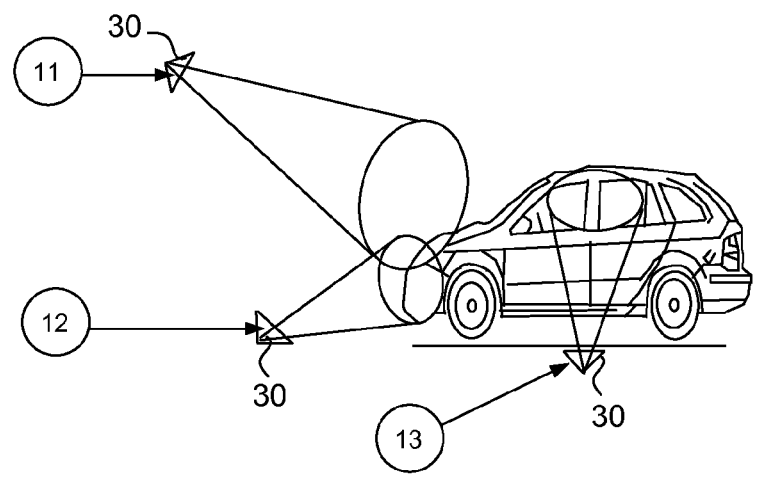
FIG. 3 shows the ability of the sensor to be mounted differently thus adapting to different geometries and installation requirements.

FIG. 3 shows the ability of the sensor 30 to be mounted differently thus adapting to different geometries and installation requirements. Element 11 shows a pole mount, where the sensor 30 is mounted on a pole. The pole may be shared with parking meter or other street infrastructure. Element 12 denotes the sensor 30 mounted on a curb face or a curb top. Element 13 shows the sensor 30 embedded under the surface. This type of mounting can also be used when the bubble is directed at an angle.

Figure 4:
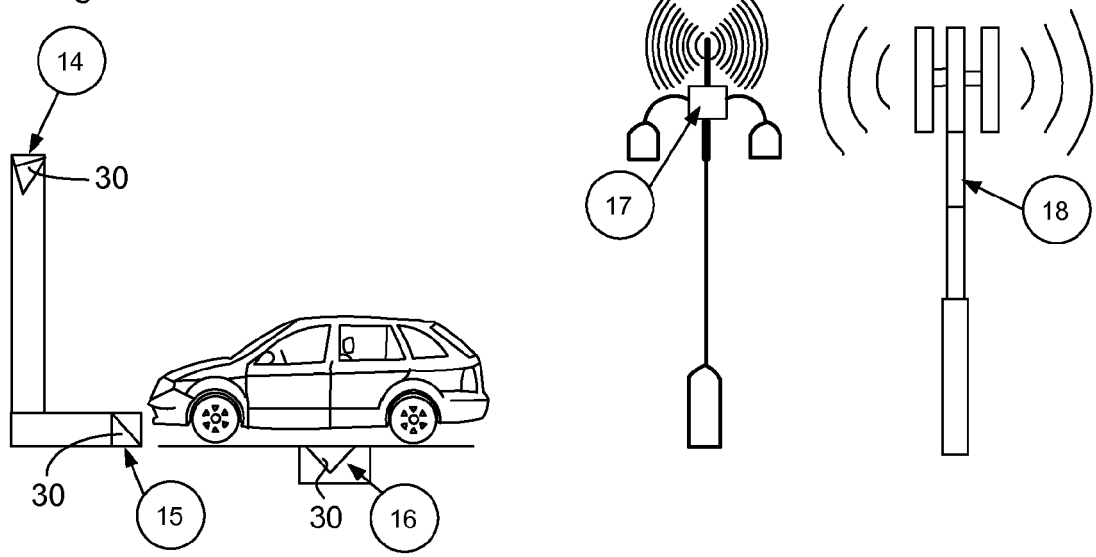
FIG. 4 shows the sensor integrated with wireless communications in any of the example locations, communicating via a gateway or repeater, or via cellular network, represented by tower.

FIG. 4 shows the sensor 30 integrated with wireless communications in any of the exemplary locations, 14, 15, and 16, communicating via a gateway or repeater 17, or via cellular network, represented by a tower 18.

In order to reduce the ranging uncertainties from a long transmit burst and to be able to measure the range at short distances, a transmit pulse train is employed that includes a brief burst of a carrier wave, not more than 6 nanoseconds, but more typically 1-3 nanoseconds effective window width. While ideally this transmit burst may have the carrier wave at full amplitude instantaneously and have a rectangular envelope, in practice, the carrier wave envelope may take a triangular, trapezoidal, or another shape (for example, 23). See FIGS. 5 and 6 for examples of these different wave envelopes. Specifically, FIG. 5 shows an illustration of a video output 20 if receive windows timing is continually swept in relation to the transmit for a fixed object and its envelope 19. FIG. 6 shows examples of transmit bursts. Element 21 shows an burst with a rectangular envelope, and elements 22, 23, and 24 show triangular, sinusoidal, and other envelope shapes.

Figure 7:
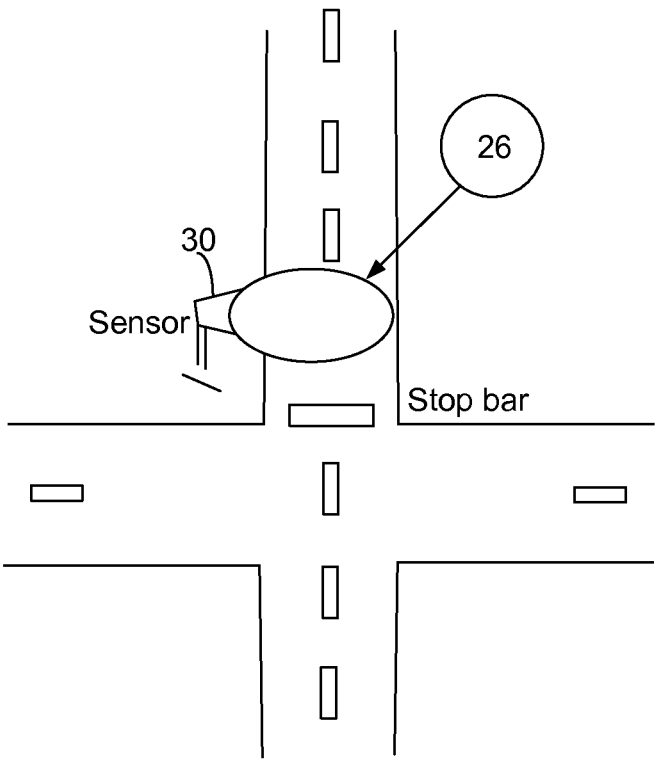
FIG. 7 shows an example location of a sensor on top of a pole with a bubble that overlaps an area immediately upstream of an intersection stop bar.
Figure 8:
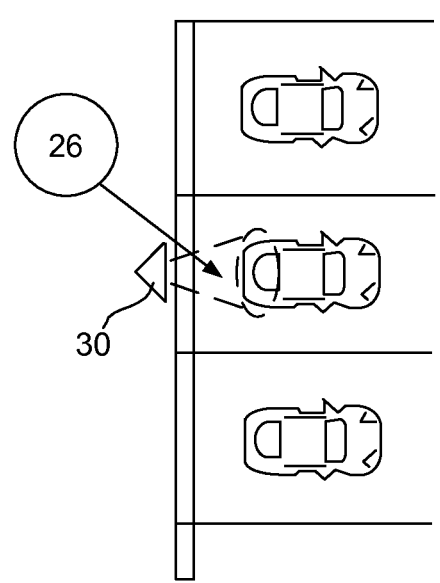
FIG. 8 shows a sensor mounted adjacent to a parking space with a bubble that is contained within the parking space being monitored.
Figure 9:
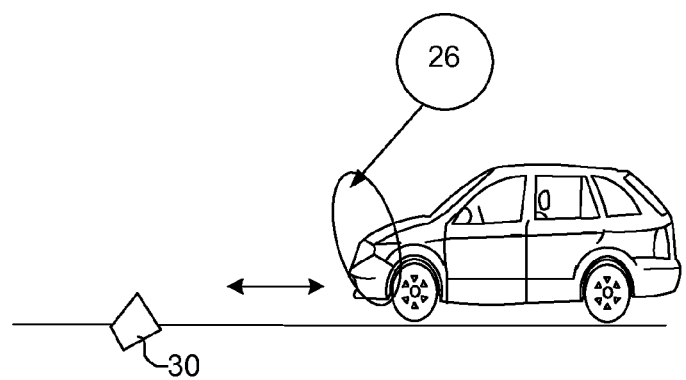
FIG. 9 shows a parking space monitoring application wherein the sensor is positioned to detect the change in ranging distance as the vehicle is approaching or receding.

FIG. 7 shows an example location of the sensor 30 on top of a pole with a bubble 26 that overlaps an area immediately upstream of an intersection stop bar. FIG. 8 shows the sensor 30 mounted adjacent to a parking space with the bubble 26 that is contained within a parking space being monitored. FIG. 9 shows a parking space monitoring application wherein the sensor 30 (with the bubble 26) is positioned to detect the change in ranging distance as the vehicle is approaching or receding.

Figure 10:
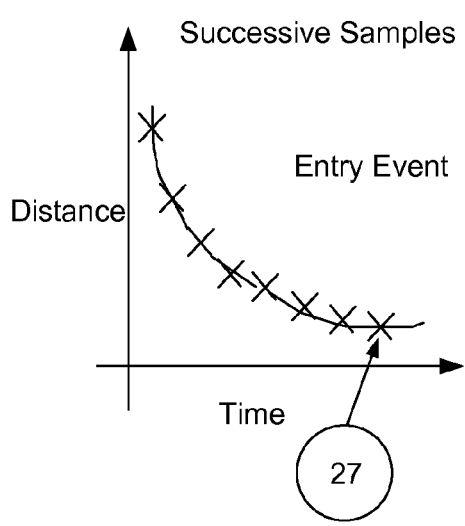
FIGS. 10 and 11 illustrate profiles of data points obtained by successive ranging samples by elements 27 and 28 for a vehicle entry and exit event respectively.
Figure 11:
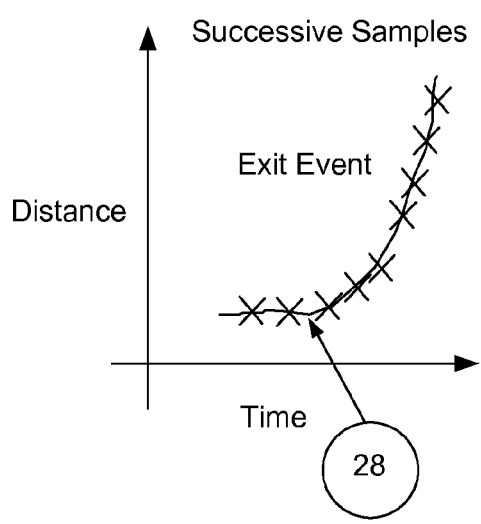

FIGS. 10 and 11 illustrate profiles of data points obtained by successive ranging samples by elements 27 and 28 for a vehicle entry and exit event respectively.

A very short transmit burst of the order of a few nanoseconds will occupy a very large portion of the radio spectrum. In order to comply with applicable rules for such transmissions, the transmit power levels need to be extremely low. This typically means that the received energy from just one or several bursts is not sufficient to make a reliable determination due to low signal to noise ratios. In order to increase the signal to noise ratio to acceptable levels, a large number of samples, which may be in the thousands to over a hundred thousand samples or more need to be integrated. This needs to be accomplished within a reasonable measurement time. In addition, the duty cycle of the device needs to be adjusted to maximize the signal to noise ratio while still being a low duty cycle device. These goals can be accomplished by using a high pulse repetition frequency for the transmit burst, for example between 5 and 30 MHz.

Generally once receive window per transmit pulse is employed. The receive window timing can be continuously swept in relation to the transmit pulse (see elements 3, 4, 5, 6 in FIG. 1) in order to generate a modulated video waveform with a fixed or adjustable sweep rate. Precise and repetitive control over the receive window's timing in relation to the transmit pulse is critical and can either be achieved by using the transmit burst's timing as a reference or using precision clocking circuitry.

Using an adjustable receive window so as to be able to control the receive window to a desired range of interest and adjust the integration period for a particular range window is an advantage. For example, in a parking space detection application, when the space is vacant, a long receive window of the order of 10-20 ns can be employed just to scan if there is any received signal within this window and when a signal is found, the receive window can be further narrowed down to more precisely range the target vehicle. The advantage of this technique is that it will shorten the duration of the sensor active time when the space is vacant or there is no change in state, which will be the vast majority of the time, and hence will enable the sensor operation with significantly lower power consumption and is one of the disclosed adaptations that will help a longer battery life.

In many cases it is desirable to have the ability to arbitrarily adjust the receive window's timing in relation to the transmit pulse. For example, this will enable a software controlled intelligent sensor to range only a narrow window of interest or selected discrete time ranges. This will enable the sensor to detect a narrower set of ranges in turn reducing the amount of time the sensor is active and reducing power consumption. For example, a two or three dimensional bubble can be defined and the sensor can only be ranging at the edges of the bubble to detect if there is any vehicle entering the bubble; or if a vehicle is parked, as an example, 3 feet distance from the sensor, the sensor can normally range only around that previously measured vehicle distance and only upon a change in status, the sensor can range other ranges. In addition, the adjustable range capability can be used by software control to integrate selected range windows over longer or shorter periods of time to provide higher or lower signal to noise ratios. For example, in a noisy environment, if potential reflections are seen at a given range, but the object reflections do not clearly differentiate form the noise, the software can hover over that and adjacent range windows for longer periods of time and get a less noisier signal in order to make a determination of the object's presence and range.

Figure 12:
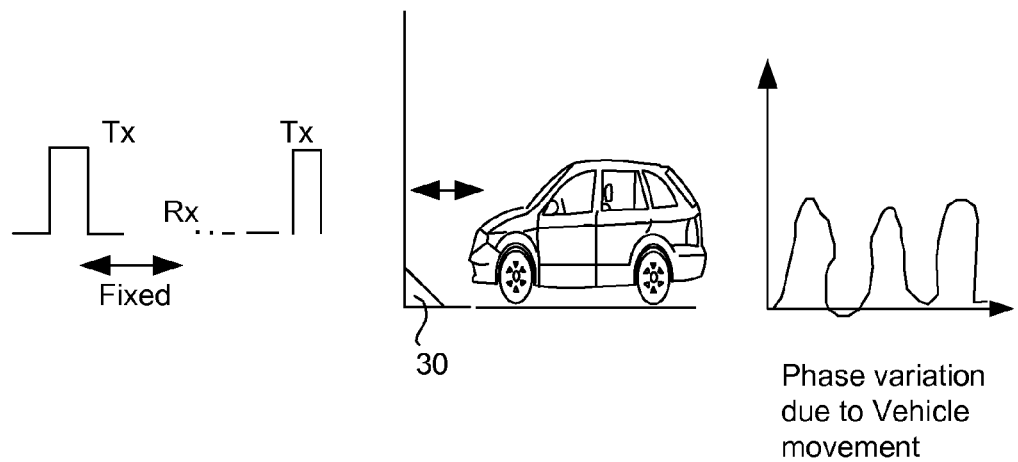
FIG. 12 shows an example implementation wherein the time window of the receive window with respect to the transmit is fixed and in which the receive may be larger than the transmit pulse duration; phase variation in the reflected signal relative to the transmit pulse caused by the target's movement can be used to measure vehicle speed and also a corroborative evidence of a vehicle movement event; for example, this can be used to definitively exclude reflected signals from stationery targets.
Figure 13:
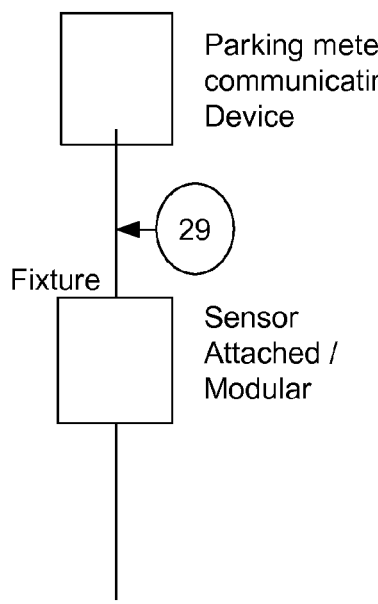
FIG. 13 shows a block diagram illustration of a wired connection between a parking meter and the sensor. The sensor may be attached to the meter or may be a modular detachable part. Element 29 represents a wired connection such as through discrete wires or a cable.
Figure 14:
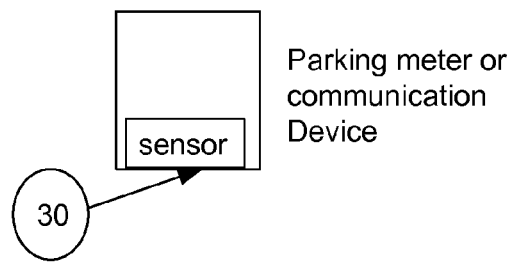
FIG. 14 shows a configuration in which the sensor is embedded within a parking meter, access control device, or any other device that can be active or passive, including a parking space marking sign or a communications device.

FIG. 12 shows an example implementation wherein the time window of the receive window with respect to the transmit is fixed and in which the receive may be larger than the transmit pulse duration; phase variation in the reflected signal relative to the transmit pulse caused by the target's movement can be used to measure vehicle speed and also a corroborative evidence of a vehicle movement event. For example, this can be used to definitively exclude reflected signals from stationery targets. FIG. 13 shows a block diagram illustration of a wired connection between a parking meter and the sensor 30. The sensor 30 may be attached to the meter or may be a modular detachable part. Element 29 represents a wired connection such as through discrete wires or a cable. FIG. 14 shows a configuration in which the sensor 30 is embedded within a parking meter, access control device, or any other device that can be active or passive, including a parking space marking sign or a communications device.

Figure 15:
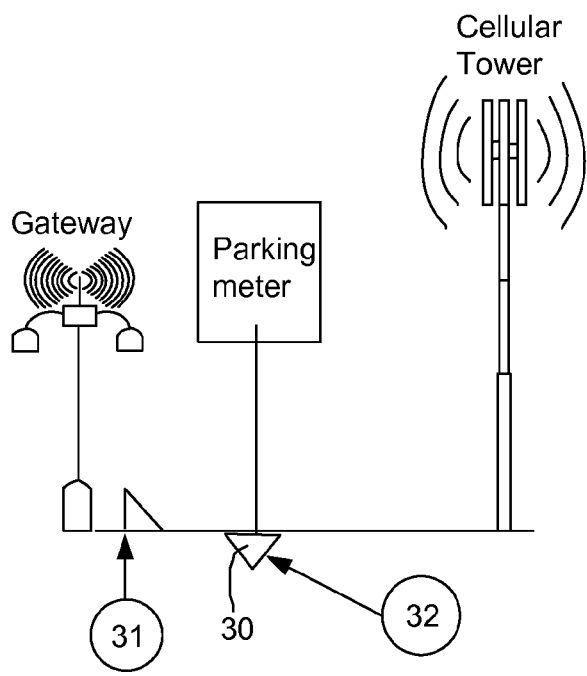
FIG. 15 shows a plurality of sensors that are wirelessly coupled to a plurality of network elements such as gateways, cellular towers, parking meters, access control devices, imaging devices, and to remote servers and databases.
Figure 16:
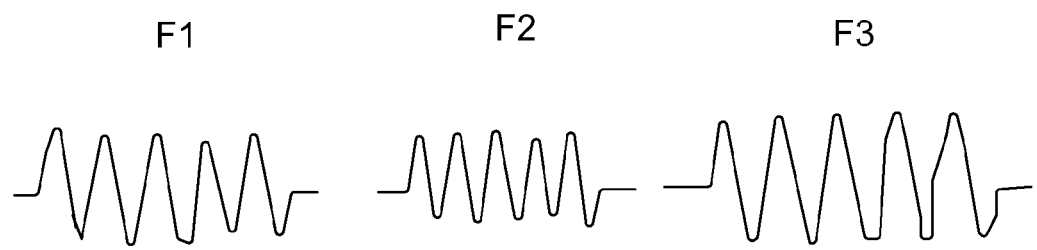
FIG. 16 shows an example in which the transmit pulses are frequency modulated for the purposes of using an overlapping or fixed receive window with respect to the transmit or communicating low data rate information to or from an in-vehicle device.

FIG. 15 shows a plurality of the sensors 30 (in locations 31 and 32) that are wirelessly coupled to a plurality of network elements such as gateways, cellular towers, parking meters, access control devices, imaging devices, and to remote servers and databases. FIG. 16 shows an example in which the transmit pulses are frequency modulated for the purposes of using an overlapping or fixed receive window with respect to the transmit or communicating low data rate information to or from an in-vehicle device.

It is critical in many applications that a precisely defined area of interest is monitored and it is important that objects within the area of interest are detected reliably and objects outside the area of interest are reliably excluded, irrespective of the size of the objects. In practice, it is common to encounter situations where there may be a smaller target object within the area of interest and a larger non-target object just outside. For example, a sensor monitoring a zone next to a stop bar in one lane, needs to avoid triggering even if a bus is present in the adjacent lane and a parking space sensor in a street parking situation needs to avoid triggering even if there are buses or trucks in the traffic lane immediately adjacent to the space. Using precise ranging, it is important that the sensor is able ignore effects of reflections from the non-target object. It is possible to have a well-defined volume of space or a "bubble" that corresponds to the zone of interest. This is accomplished using a well-characterized directional antenna and precise ranging by having a precise control of the receive window in relation to the transmit burst. The ability to orient either the antenna or the entire sensor such that the bubble covers an optimal volume over the desired space of interest will also be necessary in many applications.

Since a large number of received samples need to be integrated, it is desirable for the integrator output to be digitized for many applications. The integrator output can be treated as an analog input voltage into an analog to digital converter and digitized. In some applications, where the receive timing is swept in relation to the transmit, a modulated video waveform is generated with the envelope containing the object signature. The digitized signal can then be evaluated via software or hardware to see if it meets the criteria of an object signature and to extract presence and range information from the digitized signal. There can be multiple objects in the sensor field of view and in some cases, their object signatures may overlap. Depending on the application, the center of the object profile or it is beginning or another point can be used for range determination. In some cases a one-bit digitizer can be used comprising of a comparator and indicate whether the integrator output exceeds a certain threshold level when sampling a desired range window. The circuitry for digitalization and evaluation can employ components such as, but not limited to, microcontrollers, analog to digital converter integrated circuits, field programmable gate arrays and other programmable logic devices, analog comparators and operational amplifiers, or simple active or passive components.

In many cases, it is desirable to extract the envelope from the video signal as that is a lower frequency signal and easier to work with. Envelope information can be generated using a demodulator, low pass filter circuit or similar or by a variety of software algorithms based on filtering, peak detection or other techniques.

For some short range sensing applications, a situation often exists when the object is too close requiring the receive window close to the transmit pulse such that the object signature at the integrator output is mixed with the transmit spike or its ringing or decay. This calls for special techniques to digitize the decay and comparing the decay to known profiles using profile matching or curve fitting techniques in software and determining the variance from a predefined decay model in order to extract object signatures from said integrator output. A differential technique may also be employed here by comparing the object profile with a simulated free space profile. The free space simulation can be accomplished using an absorber material that ensures there is no reflected signal. This can be accomplished by mechanically inserting an absorber material in the radiative path, but is more easily accomplished using an additional antenna element that may be coupled with an additional transmitting element.

There are some applications in which it is desirable for the threshold for object determination to be recalculated periodically from within the sensor. Such recalculation can happen either for every measurement or periodically as a self-calibration mechanism. Drift in integrator output for example, can be detected by computing the average of the sample, detecting flat regions of the integrator response and comparing with previous measurements, or using a known range window that is guaranteed not to have an object present. For remote deployments, it is often not possible to guarantee that there will not be any object inside the bubble during calibration, and therefore, there are constraints in how the self-calibration mechanism can be setup. In a parking space detection application, for example, it is often not possible to clear out the parking space when installing, testing, or performing maintenance on a sensor. In those cases, it may be possible to use an RF or Infrared absorbing medium, depending on the type of sensor, to simulate a no target object condition. In one embodiment, a plurality of RF stages and antenna elements that can be switched can be used and an RF absorbing medium can block all radiation from one of the antenna elements. When switched to this element, a device can simulate a free space condition and thereby serve as a calibration reference.

In some cases, a material that is a known dielectric can be used to fill the spaces inside or just outside the antenna to help shape the antenna beam width to be optimal for the application. Such "beamforming" techniques allow us to use smaller antennas and shape the antenna field of view to best match the spatial area of interest and will help in achieving a narrow, defined spatial zone of interest. Also a plurality of antenna elements in combination with one or a plurality of RF stages may be used in an arrangement where some of them are may be switched to be able to steer the antenna. For example, if two adjacent spaces are being monitored by a sensor, that may be accomplished using two antenna elements that are switched based upon the desired space to monitor; or five antenna elements can be used to detecting 5 sub-zones across two parking spaces can help identify a variety of conditions, such as overlapped parking, bad parking situations, etc. This technique is especially useful when detecting vehicles in unmarked parking spaces.

There are other errors however, that cannot be corrected only using a self-calibration approach. Clutter around the transmitter is a major source of error. Many sources can contribute to clutter including cables and wires around the sensor, the sensor housing, nearby objects that may get moved into the bubble but do not by themselves make the space being monitored unusable for the targets of interest. In such cases, ideally the sensor will be able to detect a permanent changed condition and ignore the clutter and get object signatures in relation to the clutter. This approach will provide some mitigation against clutter. Software algorithms and heuristics may be employed to determine which changes in returned signal profiles represent clutter and which changes represent the intended target and it is important in some cases to separate the two. Such determination can be done by using data related to strength of the reflected signal, the duration and persistence of the object, the distance from the sensor, etc.

In some applications, it is important to distinguish between a stationery object from transient objects that are slow moving. For example, in a parking occupancy detection application, it may be desirable to count only automobiles that are fully parked and ignore sensor activations from persons walking across the spaces or shopping carts being moved across. Successive profiles from the sensor may be compared to ensure that the object signature is present and consistent for a period of time and classify the target as stationery or transient and apply suitable business rules.

Many applications will require the sensor and associated electronics, including communication components to use minimal power consumption and have a long battery life or be charged by solar cells. A priori knowledge about expected probability of an object state change can be used in some cases to dynamically adjust the interval between data samples as a way of reducing battery life. For example, in a parking application, if the peak hours or high turnover hours for parking are known beforehand the sensing in those hours can be more frequent than others. At night time or during unregulated parking hours, when the data is less important, the samples can be stopped or taken at a reduced frequency. In some cases, this data can be self-generated at the sensor by analyzing historical patterns thus making the sensor self-adaptive.

In many cases, various software filters are employed in conjunction with the digitization of the video or the envelope signal. The video waveform's signal to noise ratio can be enhanced by a narrow bandpass filter and further low pass filtering or peak detection techniques can generate a low noise envelope waveform that contains information about the object profile. Such filtering can be performed with in time domain or in frequency domain. It should be noted that the filtering and envelope detection can be generated using hardware techniques as well. If the envelope signal is digitized or computed by software filters, it can also be further filtered using low pass or bandpass filters to reduce noise and obtain the object signature.

In many cases, determining the speed and direction of travel of the target object within the detection zone is important. This can be accomplished using multiple successive range measurements to discern whether the object is moving closer to or away from the sensor. This can be used very effectively in a parking monitoring situation to determine whether a vehicle is arriving at a space or leaving the space. The multiple successive range measurements combine to form of profile of the object's movement within the area of interest. This information can be communicated to a remote system using wired or wireless means and be used as further evidence of the object's movement. The additional information can be used as corroborative evidence in an administrative adjudication process or in a court of law. When detecting persons on a walkway for example, this method can be used to determine their direction of travel. This is also useful in situations where there is travel in more than one direction within the area of interest and only objects traveling in some of those directions are being monitored. For example, in an automated gate operation application, vehicles coming in towards the gate need to be identified separately from those moving away from the gate.

The practical installation of the sensors imposes many challenges on the design. Places where the sensors are mounted such as roadways, walkways, etc. differ in construction materials, physical geometry and available mounting locations and other site specific considerations such as drainage, other uses, etc. It is important that the sensor design is flexible so as to be able to work at a particular site. In addition, the sensor may interface using wired or wireless means to other devices, such as parking meters, cameras, or gate control devices. A sensor that can be configured for various mounting locations would be highly desirable. This can be accomplished by means of separate enclosures, optimal direction of the antenna, and software configurations such that the detected object and clutter profiles are appropriate for the particular mounting arrangement.

Figure 17:
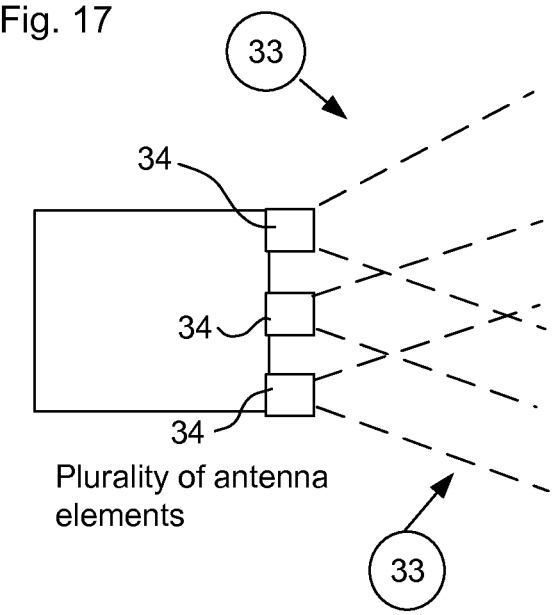
FIG. 17 shows a sensor with a plurality of radiating elements, each radiating preferentially in a different direction so as to cover multiple zones of interest or multiple regions within a zone of interest.
Figure 18:
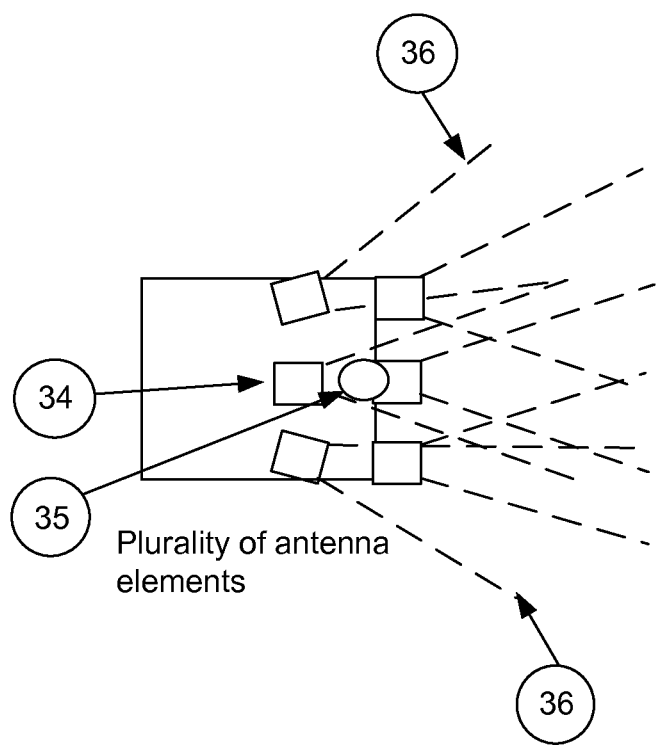
FIG. 18 shows a sensor configuration with a plurality of radiating elements, at least one of which has a radio frequency absorber material used for the purposed of calibrating the sensor.

FIG. 17 shows a sensor with a plurality of radiating elements 34, each radiating preferentially in a different direction so as to cover multiple zones of interest 33 or multiple regions within a zone of interest. FIG. 18 shows a sensor configuration with a plurality of radiating elements 34, at least one of which has a radio frequency absorber material used for the purposed of calibrating the sensor.

Figure 19:
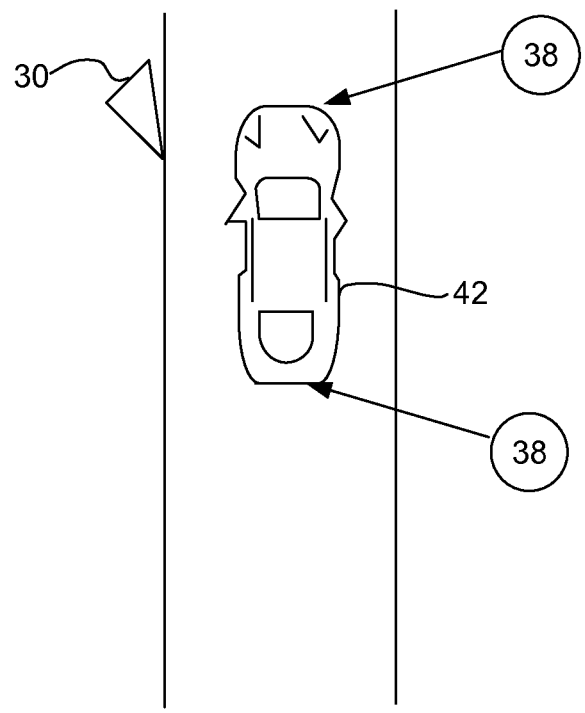
FIG. 19 shows a vehicle with its in-vehicle device within range of a sensor to enable one-way or two-way communication.
Figure 20:
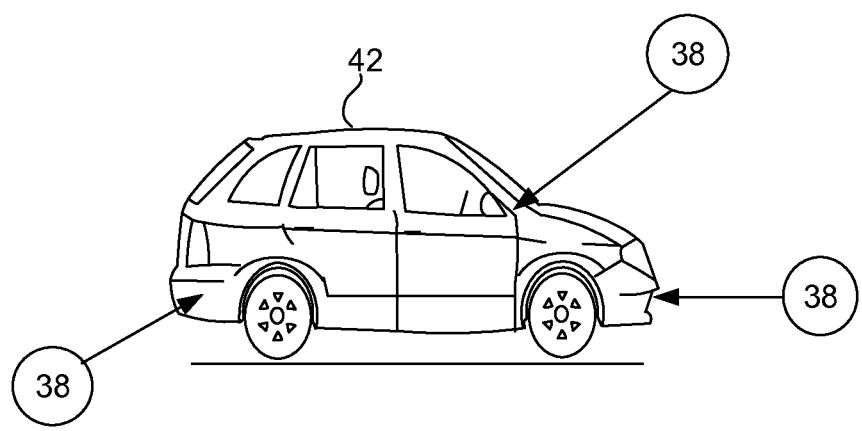
FIG. 20 shows some of the possible locations for locating an in-vehicle device which include inside the vehicle chassis or outside near the front or rear of the vehicle.

FIG. 19 shows a vehicle 42 with an in-vehicle device within range of the sensor 30 to enable one-way or two-way communication. FIG. 20 shows some of possible locations 38 for locating the in-vehicle device which include inside the vehicle chassis or outside near the front or rear of the vehicle 42.

Figure 21:
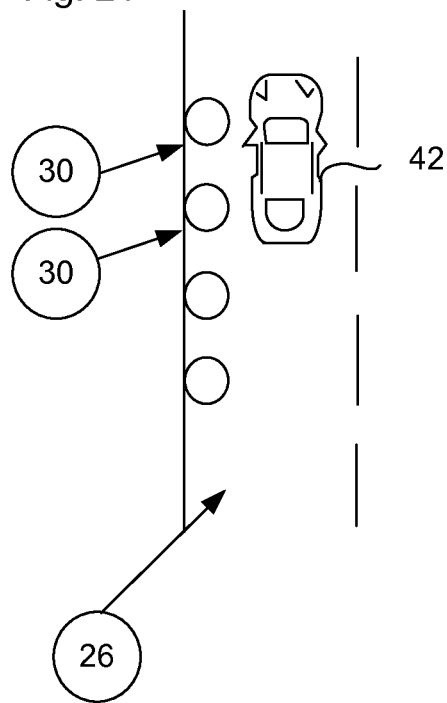
FIG. 21 shows a plurality of sensors deployed close to each other with some of the bubbles overlapping used in an unmarked parking application.
Figure 22:
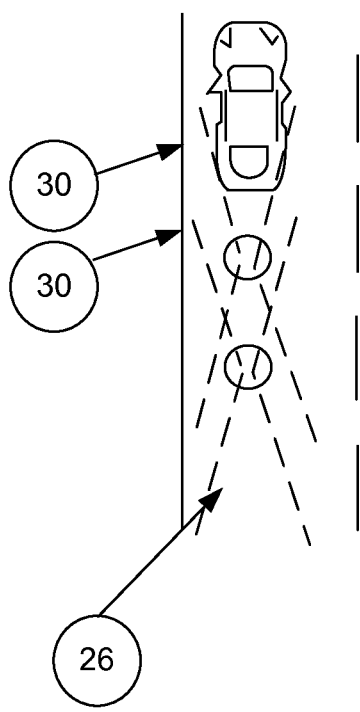
FIG. 22 shows a subterranean deployment of sensors, each with a plurality of radiating elements positioned to detect occupancy and vehicle movement with apriori expectation of the vehicle's position.

FIG. 21 shows a plurality of the sensors 30 deployed close to each other with some of the bubbles 26 overlapping used in an unmarked parking application. FIG. 22 shows a subterranean deployment of the sensors 30, each with a plurality of radiating elements positioned to detect occupancy and vehicle movement with apriori expectation of the vehicle's position. A plurality of the sensors 30 so deployed could cover the unmarked set of parking spaces.

Figure 23:
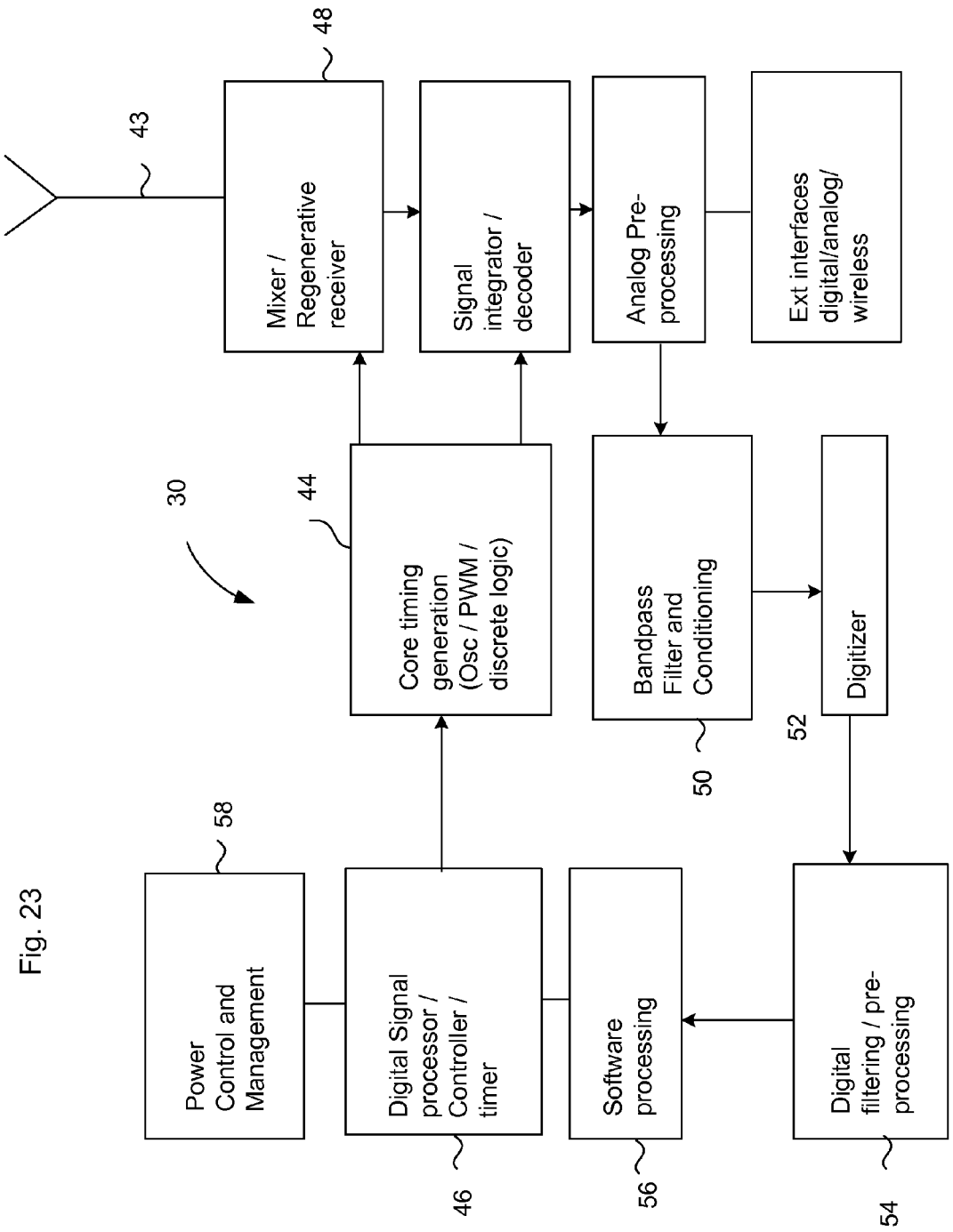
FIG. 23 shows the schematic diagram of the sensor.

The directional sensor 30 for the purposes of detecting the presence of a vehicle or an object within a zone of interest on a roadway or in a parking space, according to the present invention, is schematically shown in FIG. 23 and comprises:

means for transmitting a microwave transmit pulse such that a total distance occupied by the pulse in air is less than 5 feet;

a directional antenna system to enable the transmit pulse to be radiated preferentially towards a detection area;

an adjustable receive window to receive received pulses, said receive window being precisely timed in relation to the transmit pulse with the receive window being similar or different (smaller) in duration than the transmit pulse;

means for integrating or combining signals from multiple received pulses to increase a signal to noise ratio;

an amplifier and filter for amplifying and filtering the integrated receive signal to further increase the signal to noise ratio;

means for digitizing the combined signal using an analog to digital conversion process;

means for comparing the digitized signal to preset or dynamically computed threshold values to determine the presence or absence of an object in the field of view of the sensor; and at least one pulse generator with rise and fall times of less than 3 ns each and capable of generating pulses less than 10 ns in duration for controlling the transmit pulses and receive windows.

An exemplary schematic diagram of the sensor 30, shown in FIG. 23, comprises a directional antenna 43 and a core timing generator 44 capable of generating sharp pulses with rise and fall times less than about 3 ns each and small pulse widths, typically less than 10 ns. The timing generator 44 may in turn be controlled or synchronized via a digital signal controller (or a microprocessor) 46. In some embodiments, the core timing generator 44 may use an internal reference oscillator. The timing generator 44 controls the transmit and receive windows and their relative timing and depending on the embodiment, provides sweep, fixed, or discrete or arbitrarily adjustable capabilities. The sensor 30 further comprises a Mixer and Regenerative receiver 48 that represents an RF block including an RF oscillator tuned to a desired center frequency, a low noise amplifier, to amplify incoming reflected signals, a mixer/detector that can use regenerative techniques to generate a low frequency voltage that is a function of the reflected RF and amplified by the low noise amplifier. The low frequency voltage or current is further filtered through analog signal conditioning means 50. A digitizer 52 can be a single bit digitizer using a comparator or an analog-to-digital converter (ADC) circuit. The ADC 52 can be integral to a microcontroller or a digital signal controller or be a part of a circuit block on its own. The digitized signals can be further filtered, conditioned and processed through digital filtering/processing means 54 and software means 56. Various business rules and heuristics such as for reconfirmation checks, vehicle based rules, and others are executed through the software means 56. A power management and control block 58 is used to regulate one or more voltages required by the various parts of the circuit as well as to turn off power to the parts of the circuits in idle mode when they are not required, including in-between samples.

The sensor output can be a data stream, or a digital or analog indication of vehicle presence or absence. This signal can be electrically coupled to another device including but not limited to parking meters, cameras, or gates, or can be coupled to a communication device such as a wireless modem or repeater. The information from the sensor including presence detection, range, direction, and profiles, can be sent to remote server for storage and further processing.

In one embodiment of the sensor 30, a figure of merit related to the confidence level of the object detection and measurement can be calculated using one or more of the data available in the sensor, including the returned signal strength, consistency in readings in multiple readings, distance of object detected, signal to noise ratio calculated in the device, The calculated confidence level can be transmitted to a remote server along with the detection and measurement results and used by an end system such as an enforcement camera, parking meter, or an adjudication process.

In one embodiment of the sensor, the receive window is kept constant with respect to the transmit during a part of or the whole measurement duration. In this mode, a phase variation of the reflected RF is caused by the movement of the vehicle. This phase variation is sampled using analog or digital means and is used to compute the velocity of the vehicle. In addition, this information can be used as corroborative data to definitely establish a vehicle ingress or an egress event in an administrative adjudication process or in a court of law.

In another embodiment of the sensor, the receive window may be adjusted to overlap with the transmit or a single window may be used for both receive and transmit with a suitable pulse width. This mode is particularly useful for detecting objects at very close range, for example, within 2 feet from the sensor. In a further variation of this embodiment, a plurality of RF stages and antenna elements can be used in a switched manner such that the RF path to the object traverses a plurality of lengths and if an object is present, at least of the lengths will result in a suitable phase difference between the reflected and the transmitted pulses to enable detection using a regenerative circuit or other means.

The sensors are typically deployed as a network of sensors covering a plurality of parking spaces or road lanes. The wireless or wired communication means electrically coupled to the sensor can be considered as a part of the sensor network communicating to one or more remote servers and databases.

The sensors may contain baseline profiles that are a function of the ranging distance, temperature, the integration time, or other parameters available from the sensor. Such profiles may use a combination of constant pre-determined data and data derived from the sensor either one time prior to installation or dynamically through a processor means.

The sensor may be programmed with distances to range, time intervals that correspond to ranging distances, or geometrical properties of the zone of interest. The software means in the sensor can be used to derive pulse timing information or sweep rate information from the programmed data and this may further be used to control the sensor operation in the desired mode of operation. The programmable parts of the sensor and its configuration, including profiles, zone information, bubble and ranging information, sensitivity and threshold values, and the software executable code and its configurable elements can all be wirelessly downloaded using an appropriate protocol from a remote server. Such wireless downloads can be initiated by the server when the wireless module electrically coupled to the sensor is active. Such downloads may also be initiated by the processor means electrically coupled to the sensor querying the server for suitable downloads. For example, the sensor may be programmed to query the server once a day to check for any updates of executable or configuration elements and upon server response commence the download protocol.

The sensor processor means may further contain a hardware or software watchdog to detect software or hardware malfunctions and automatically reset itself. In addition, a backup copy of an older or proven executable and configuration elements may be stored in persistent storage coupled to the processor means and in case of any malfunctions, the processor means may be programmed to try the backup copy. These features of wireless downloads and self recovery from faults are very important in applications where the sensors are remote and unattended or embedded in the road surface or curb and access to sensors is not available or is very expensive.

The low power features and battery operation in the present invention lend the sensor to be permanently installed in the road pavement or in the curb. The directional nature of the sensor enables us to configure the sensor for a wide range of geometries, and to locate the sensor on the curb or on a meter pole, outside the zone of interest. The ability to deploy the sensor based on the site characteristics is of great value in operating the sensor.

The sensor may be programmed to send its diagnostic data periodically to a remote server using the wired or wireless communication means that is coupled to the processor means. Such information may be used to reconcile the sensing data and monitor the health of the sensor. Example data elements that can be sent for this purpose include occupancy time or ratio, counts of vehicle entry and exit events, battery voltage, count of samples taken, sensor active times, signal strength or quality metrics of the wireless link and other data available at the sensor.

The sensor signals or data communicated through the wired or wireless means can be used by a parking meter to provide free time or to remove time from the meter or to provide information for enforcement personnel. For example, when a vehicle enters a parking space near a retail establishment, it may be desirable to provide s set amount of free time, say 15 minutes and the patron can be allowed to pay a meter to add to that. In this configuration, upon the sensor detecting a vehicle entry event, the data or signals it communicates using wired or wireless means can update the meter time. This can be accomplished whether the sensor first communicates to a remote server via a wireless network, including any gateway components, or the sensor send the signals or data to a parking meter using wireless or wired means.

In one embodiment of the sensor, the sensor can also act as a transponder to communicate with in-vehicle devices or handheld devices of maintenance and enforcement personnel. Modulation techniques to modulate a stream of pulses are well known, including pulse position modulation, pulse width modulation, phase modulation, frequency modulation, etc. The sensor pulses can be modulated to transmit information indicating the sensor operation or other data such as the lane number, space number and enforcement hours and tariff to in-vehicle or handheld devices.

In another embodiment, the sensor can further be wirelessly coupled with an in-vehicle device capable of transmitting back to the sensor pertinent information, such as vehicle type, a unique identification of the vehicle, or classification of the vehicle.

The in-vehicle device may be mounted in the interior or exterior of the vehicle chassis and may have a plurality of antennas. Alternatively, a plurality of in-vehicle devices may be used to cover the front and back of a vehicle. Since in some parking spaces, vehicles can park either in a front-in or a back-in configuration, a single in-vehicle device with antenna may not be sufficient.

The in-vehicle device can use an RF amplifier to amplify the transmitted pulses and at least one fixed or programmable delay element and retransmit the amplified RF. This technique enables mirroring the incoming RF from the sensor and simulates a target at various ranges. The received profile from such a delayed mirror transmission can be easily distinguished from a physical target by its profile as well as the specific time slots that the in-vehicle device transmits. As an example, the in-vehicle device may transmit a code at specific ranging intervals, that will form a unique signature of an in-vehicle device. In addition, the code can contain a specific identification of the device that indicates unique vehicle identification, vehicle class, etc.

In another embodiment, the in-vehicle device can have a dynamically programmable delay code to transmit bits of data back to the sensor across multiple time sequences. This method will enable a longer code to be transmitted to the sensor.

In one embodiment, the sensor can adjust the receive window to prevent an unfavorable fixed phase between the return signal and the transmit such that they cancel each other and prevent detection. Alternatively, the in-vehicle device may contain circuitry or logic to alter the delay to avoid this issue.

The identification of the vehicle, including unique vehicle identification, can be used by devices that are coupled with the sensor or a sensor network to grant preferential or differential treatment to the vehicle or to apply business or enforcement rules. This can be in the form of a gate access, lane access, discount schemes in a toll lane or a parking application, or to apply different business rules based on the vehicle identification or vehicle class received. The data can also be encrypted between the in-vehicle device and the sensor to prevent tampering.

The exchange of information between the sensor and an in-vehicle device may be packaged as or may conform to a communications protocol.

In one embodiment, the sensor can have a plurality of antenna elements with either a single RF stage or a plurality of RF stages. This capability also serves multiple purposes. For example, in a parking situation, two spaces may be covered by a single sensor. In another example, two zones covering the two edges of a parking space and another covering the middle may be used. If a vehicle is parked improperly in the space, two of the three zones will be occupied. If two adjacent vehicles are parked too close to the space under detection, the two edges will be occupied and the middle will be vacant. In a roadway configuration, a similar technique may be used to accurately determine the lane of travel. There are many applications where the parking spaces are unmarked. In these situations, it is not possible to predict where a vehicle will park in relation to the sensor. The available parking surface can be sampled as multiple smaller zones with one or more sensors and the resulting data can accurately determine the occupancy status and where a vehicle is located.

In one embodiment, the sensor is used as a low power monitoring device in a roadway or an entry way. When the sensor detects a vehicle or an object it is used to power on or wake up one or more additional devices, such as radar, Lidar, imagers, physical access control devices such as gates or barriers, electronic access controls, and communication devices. This is very useful in a battery powered application, such as portable traffic counting, portable speed enforcement, or surveillance application on a roadway or an entryway.

The processor means, software means, timing and digital control circuitry, analog filters and processing circuitry, RF circuitry and antenna elements and other functional modules can reside in one or more boards that may be directly connected or interlinked through cables and connectors.

In accordance with the foregoing description, the present invention provides a method of detecting change in occupancy state over a defined zone of interest on a roadway or parking space by computing the distance in 2 or 3 spatial dimensions from a directional ranging sensor to each boundary point of the zone of interest and adjusting the range monitoring parameters to monitor at or near the boundary distances to quickly detect when any vehicle enters the zone boundary, wherein the distance computation to the boundary may be manually set in hardware, preset in software, or dynamically computed in software logic.

The present invention further provides a method of programming a directional ranging sensor used to detect the occupancy of a zone of interest in a roadway or parking space with programmable parameters such as location of sensor, width of traffic lane or parking space, that correspond to the geometric properties of the roadway zone of interest or parking space and the sensor programmatically computing the monitoring parameters for optimal detection.

Additionally, the present invention provides a method of using a roadway or parking space sensor that modulates the transmit pulses of the sensor with additional information, such as lane number, maximum speed, space number, hours of operation, maximum duration of stay, or other pertinent information.

The invention further defines the step of using any of pulse position modulation, phase modulation, frequency modulation, pulse width modulation or similar techniques.

According to the present invention, an in-vehicle device is capable of receiving the transmissions and sending a time-coded signal to the sensor that simulates range information is used with the in-vehicle device locking phase and frequency with the sensor transmission. The in-vehicle device transmits a unique vehicle identification data to the sensor.

The sensor transmits information back to the in-vehicle device that is all or in part derived from all or a portion of the vehicle identification data obtained from the in-vehicle device. Additionally, at least one of the sensor transmission and the transmission from the in-vehicle device may be encrypted for security purposes. With the invention, the unique vehicle identification is used to automatically provide roadway or parking services such as preferential access, permitted access, discounts, or other services. Additionally, the unique vehicle identification is used to detect scofflaw, stolen vehicles, or other vehicles of interest.

In accordance with the invention, the sensor transmission rate may be increased when a vehicle ingress event is detected to receive the information from the in-vehicle device.

The in-vehicle device may incudes a low-noise radio frequency front-end amplifier and at least one delay circuit. A plurality of sensors and a plurality of in-vehicle devices may have communications compatibility in order for a given sensor to communicate with any of the vehicles with such capability. The in-vehicle device may include two or more antenna elements to cover the front and back of a vehicle. The plurality of in-vehicle devices may be used within a vehicle and they share all or a part of their unique identification number in order to determine that they belong to the same vehicle.

In accordance with the invention, a method of using a roadway or parking space sensor is provided that combines or colocates the sensor with a radio frequency transmission device to transmit additional information, such as lane number, maximum speed, space number, hours of operation, maximum duration of stay, sensor operational status, or other pertinent information.

Further, the invention provides a method of using a directional, radio frequency time of flight sensor for the purposes of detection of the motion or the presence or absence of an automobile on a zone of interest on a roadway or in a parking space that includes a plurality of antenna elements, aligned in a plurality of directions, with the ability to switch between the elements to detect multiple zones of interest or multiple portions of a given zone of interest.

The invention further includes selectively giving more weight to some zones or portions of a zone as detected by the plurality of antenna elements. The plurality of antenna elements may be provided with an RF absorber element to be used as a calibration reference.

A software means may be used to compute the difference between the calibration reference and the measured profile of a target object in order to determine the presence and range of the target object.

The sensor may contain any combination of a processor means, a software means, timing means, digital or analog filter means, and power management means where in each of these functions may reside on a plurality of circuit boards that are electrically coupled using connectors and cable means.

A plurality of sensors may be deployed in unmarked parking spaces with a separation less than one car length in order to detect vehicles parked in unmarked spaces. The plurality of sensors each with a plurality of antenna elements may be deployed in unmarked parking spaces such that the combines zones cover the full area of parking spaces and the software means is used to discriminate vehicle position and occupancy status.

The sensor is operated by at least one of battery power or solar power.

The sensor may be embedded permanently within the road-surface or curb or attached permanently to the curb. The sensor may be programmed to use variable sample rates based on estimated frequency of activity in the zone of interest, speed of movement within the zone of interest, or time of day.

The sensor can be programmed to send diagnostic data to a remote server or meter periodically. The occupancy information from the sensors is used to detect lane use or parking violations and transmitted wirelessly to any field devices including, field enforcement aids, or dynamic street signage.

The processing means maybe coupled with a failure recovery mechanisms including hardware or software watchdog mechanism to detect device failures and backup copies of executable code and configuration elements in persistent storage.

Successive profiles may be obtained using a set of ranging samples are compared for a period of time to determine whether the target object detected is stationery or a transient object.

Figure 24:
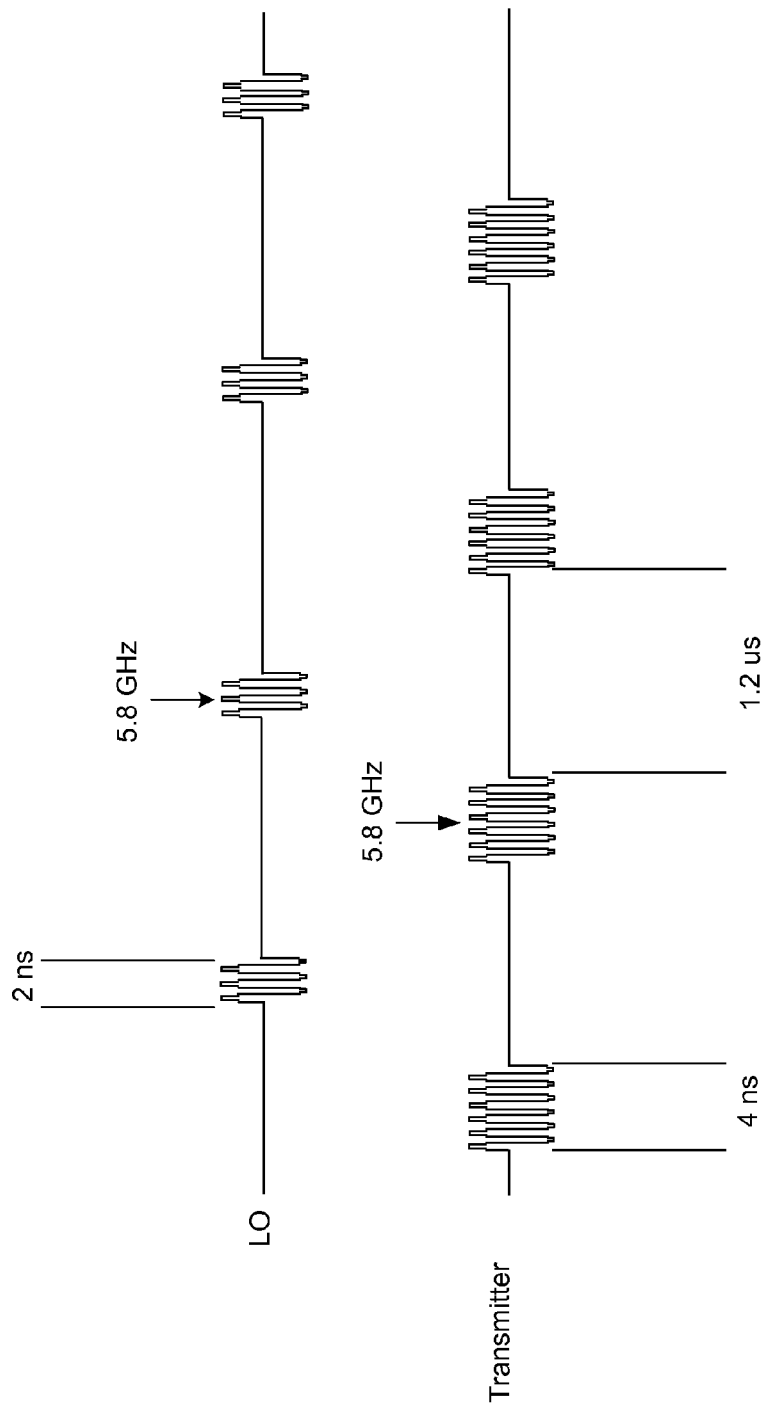
FIG. 24 shows example pulses used for the transmit pulse and the local oscillator pulse used in a receiver local oscillator corresponding to the receive window; the timings indicated are for example purposes only.
Figure 25:
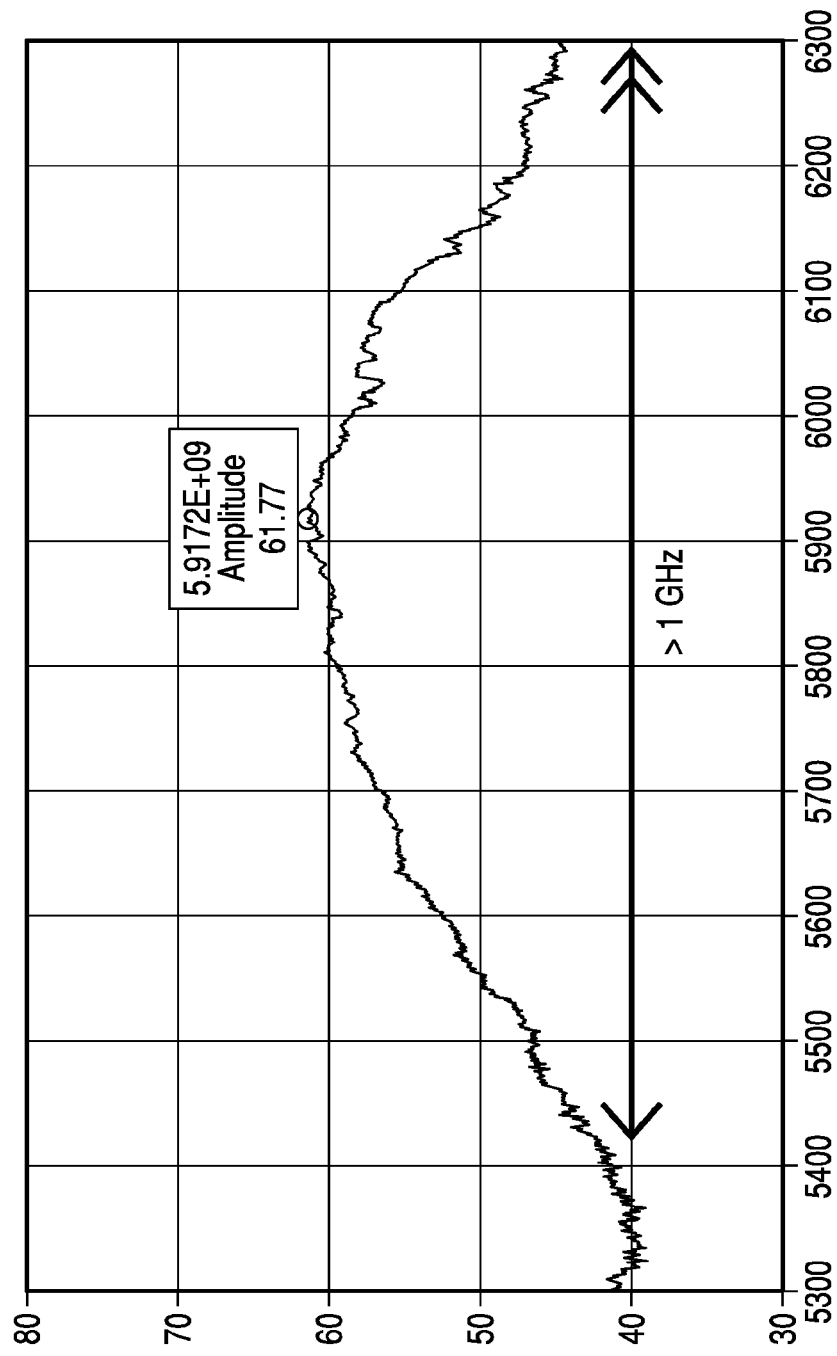
FIG. 25 shows an example spectrum of emission generated by a short pulse.

FIG. 24 shows exemplary pulses used for the transmit pulse and the local oscillator pulse used in a receiver local oscillator corresponding to the receive window; the timings indicated are for example purposes only, while FIG. 25 shows an exemplary spectrum of emission generated by a short pulse. In other words, FIG. 25 shows an example schematic of the timing circuitry using a clock edge synchronization and a Pulse Width Modulation generator with two channels. The first channel is used with an adjustable delay to generate the transmit pulse of fixed or adjustable width. The second channel has an adjustable delay in relation to the same reference clock edge and has an adjustable pulse width. The two pulses may be added together to generate the transmit and receive windows control for the RF stages.

Figure 26:
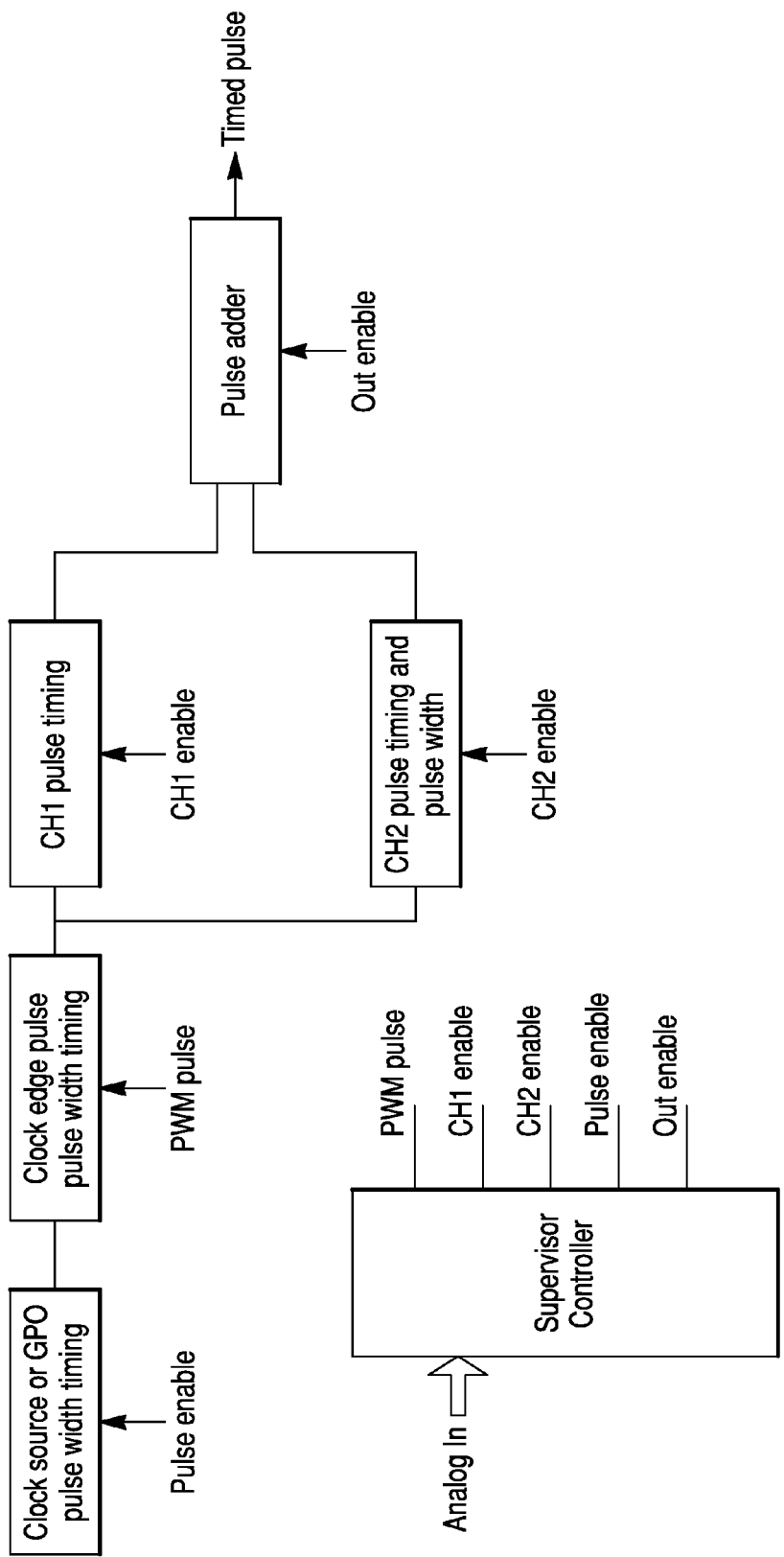
FIG. 26 shows a schematic of a timing generator to generate the transmit pulses and synchronize the receive windows with respect to the transmit window.

FIG. 26 shows a schematic of a timing generator to generate the transmit pulses and synchronize the receive windows with respect to the transmit window. Specifically, FIG. 26 shows an exemplary discrete digital timing generator with a discrete receive window width that is digitally controlled by a microprocessor. This implementation incorporates a reference oscillator to serve as the clock source, a fixed first pulse to for the transmit pulse and selectable delays that can be selected by a processor means and combining the two pulses to form a single pulse stream of transmit and receive pulses.

Figure 27:
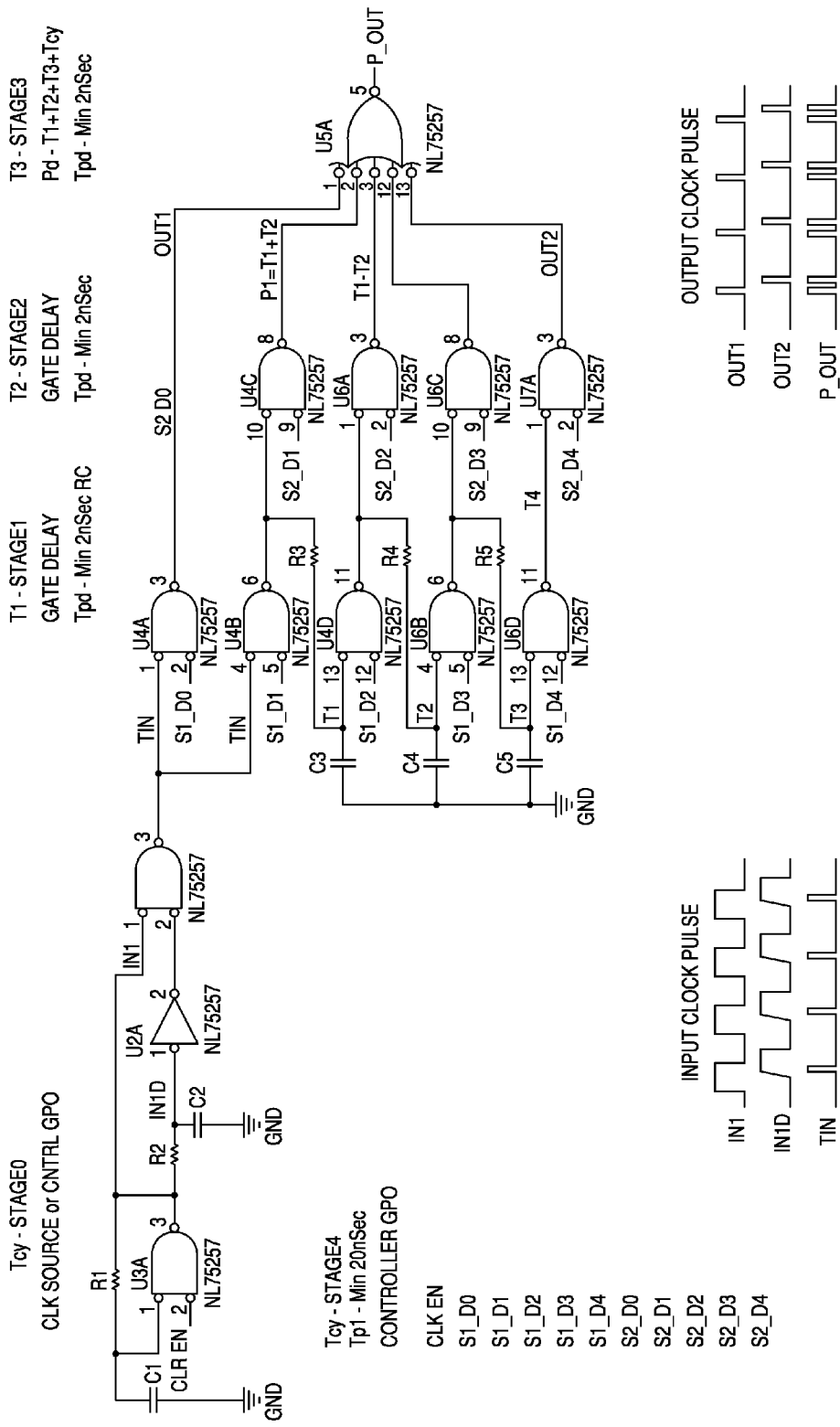
FIG. 27 shows an example discrete digital timing generator with a discrete receive window timings that are digitally controlled by a microprocessor

FIG. 27 shows an example discrete digital timing generator with a discrete receive window timings that are digitally controlled by a microprocessor. Specifically, FIG. 27 shows an exemplary digitally controlled timing generator controlled by a digital signal controller. The transmit and the receive pulses are generated by the digital signal controller and use programmable pulse widths and timings.

Figure 28:
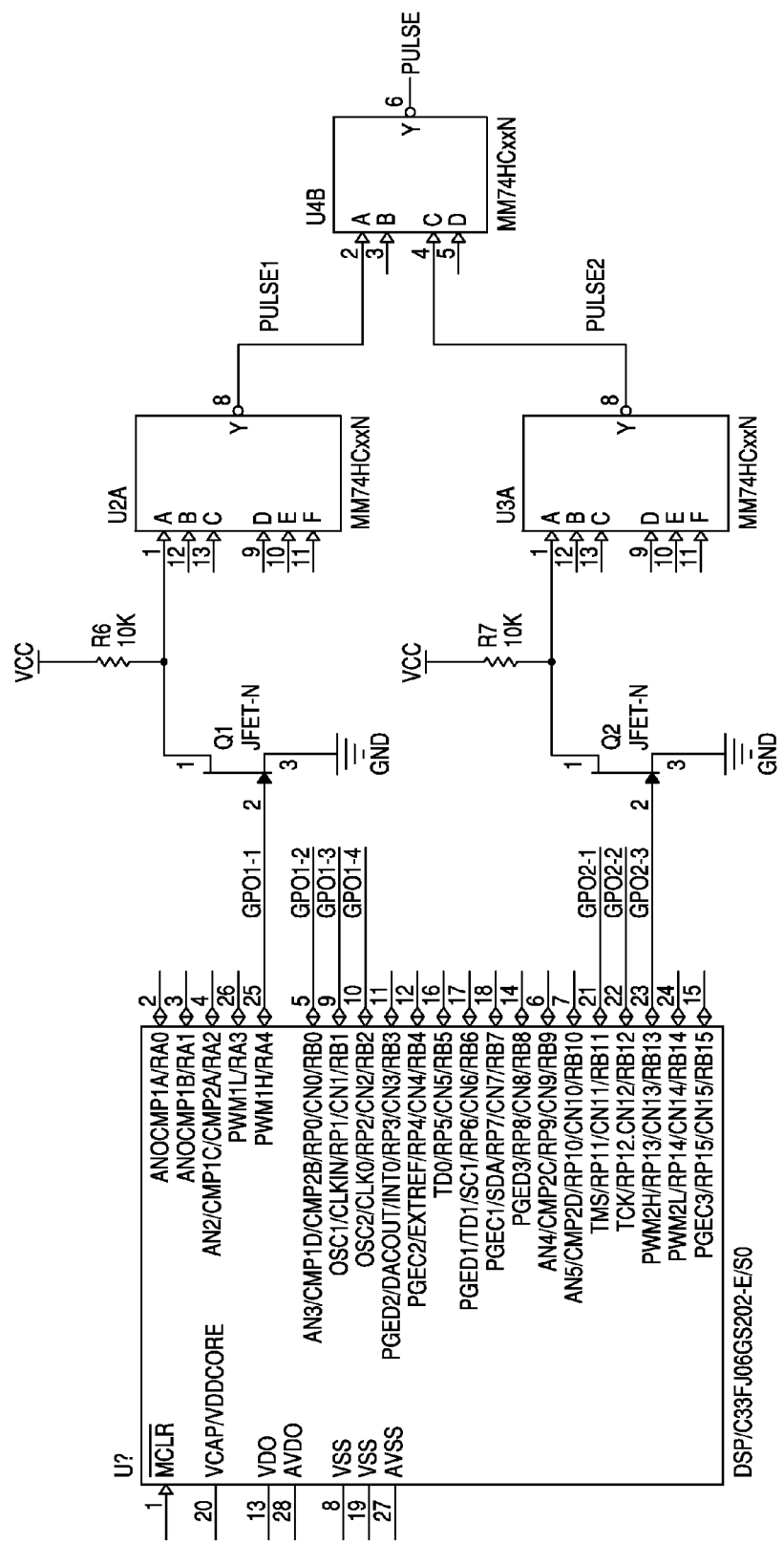
FIG. 28 shows an example of a digitally controlled timing generator controlled by a digital signal controller.
Figure 29:
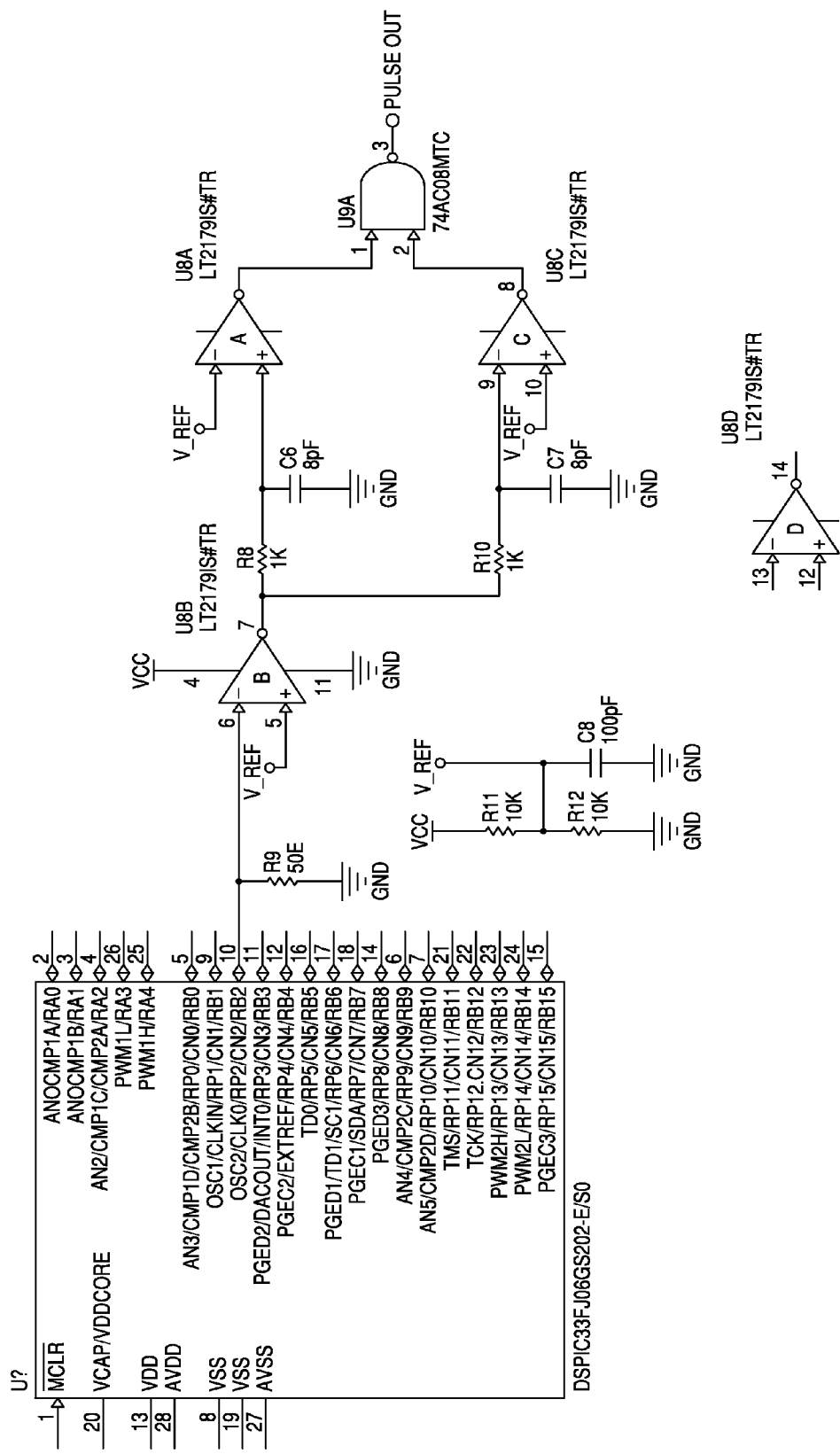
FIG. 29 shows an example of an analog timing generator that can be used with both the base frequency as well as the reference voltages controlling the pulse widths are set by a microprocessor.

FIG. 28 shows an example of a digitally controlled timing generator controlled by a digital signal controller, while FIG. 29 shows an example of an analog timing generator that can be used with both the base frequency as well as the reference voltages controlling the pulse widths are set by a microprocessor. Specifically, FIG. 28 shows an exemplary analog timing generator that can be used with both the base frequency as well as the reference voltages controlling the pulse widths are set by a microprocessor through an analog-to-digital converter that may be integrated within the microprocessor or be an external component. The first comparator generates an edge with fast slope to serve as a timing reference. The reference voltages set at the second and third comparators determine the time delay in their respective outputs relative to the first comparator output. The difference in time delays realized through the logic gate enables controlled and narrow pulse widths.

Figure 30:
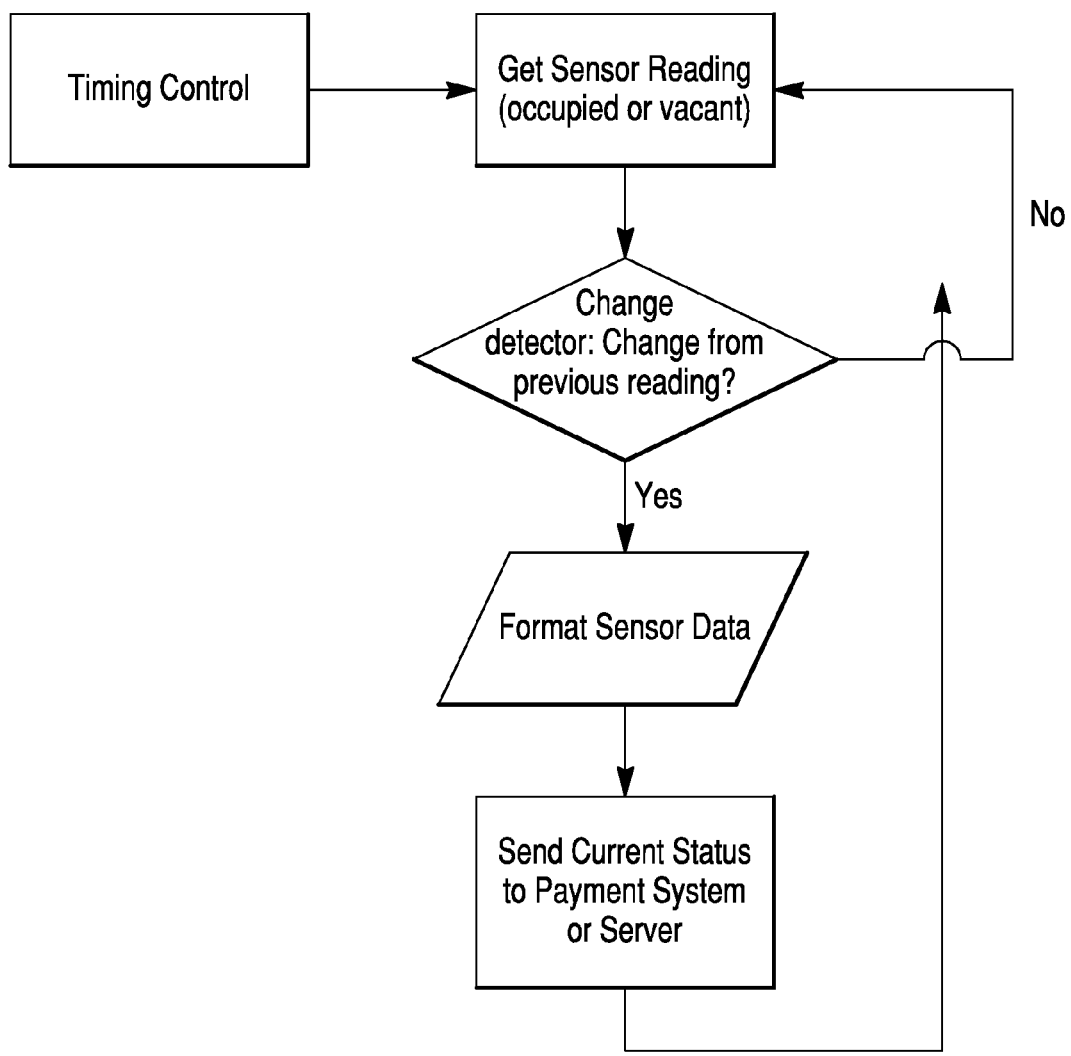
FIG. 30 shows a flow diagram related to the detection of characteristic change by the sensor.
Figure 38:
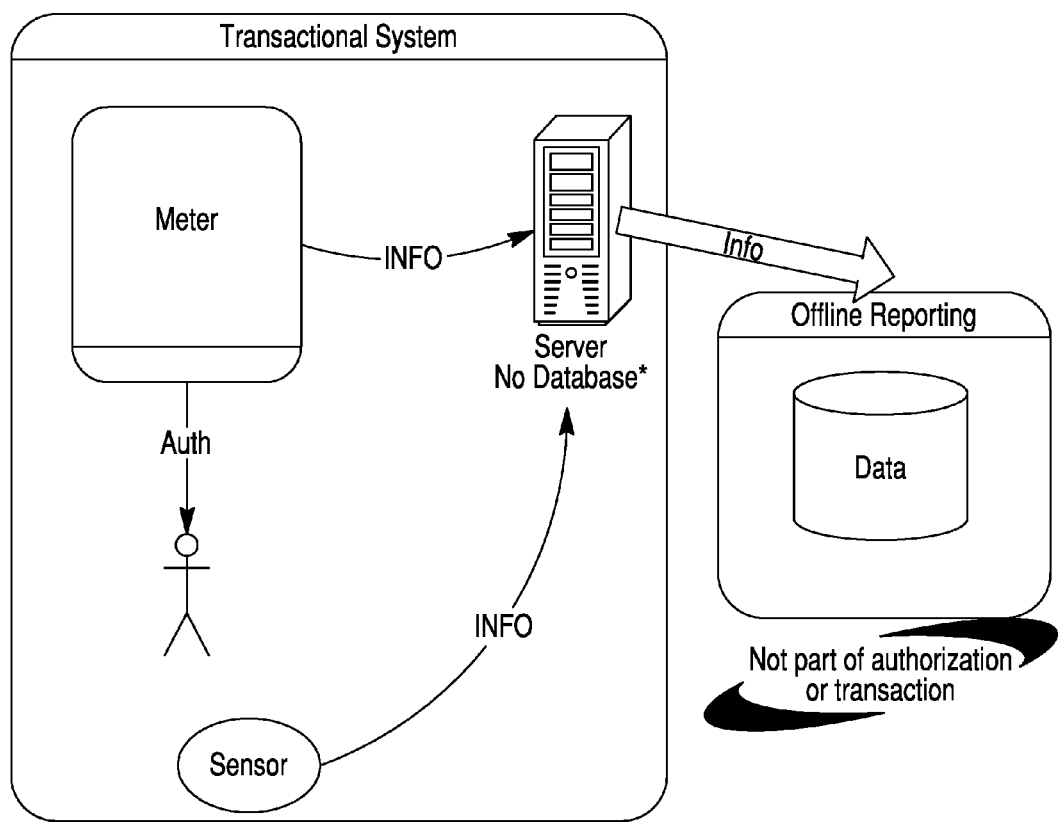
Figure 39:
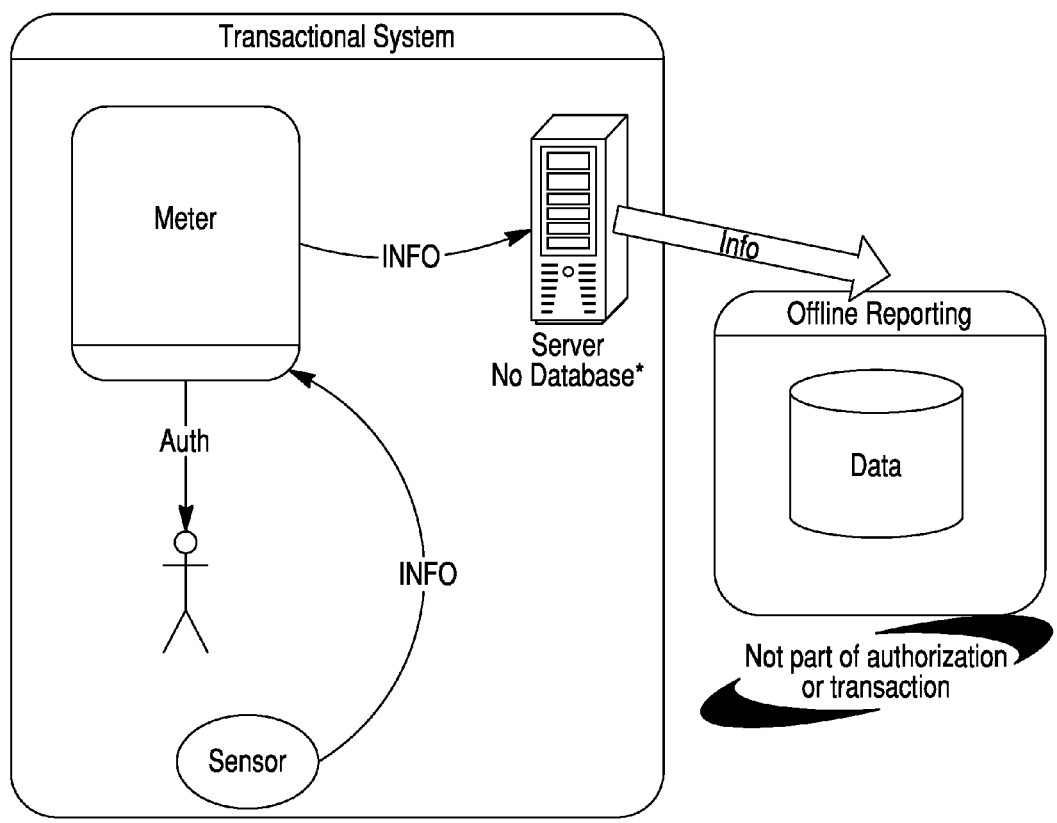
FIG. 39 shows the sensor unit attached to and communicate with the payment system (parking meter).
Figure 41:
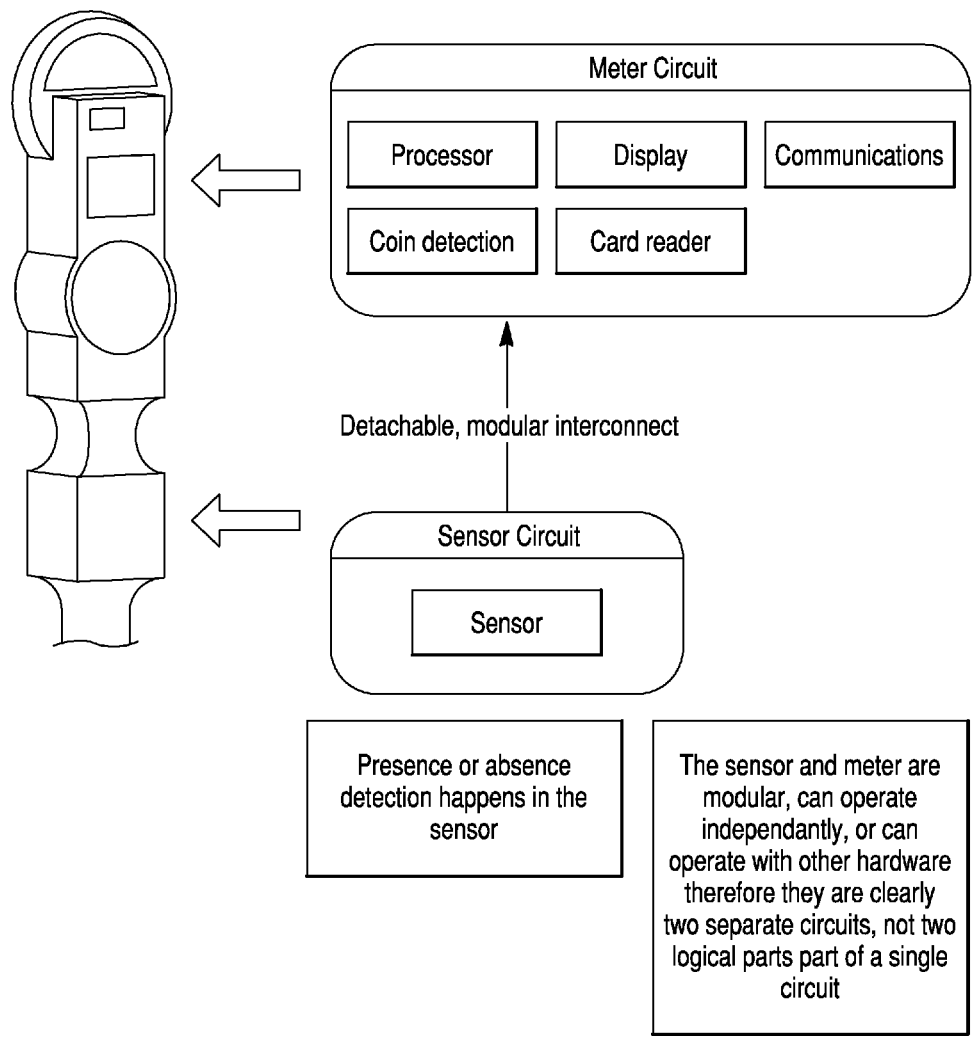
FIGS. 41 and 42 show how the sensor circuit and the meter circuit are separate circuits, and not two logical portions of a single circuit.
Figure 42:
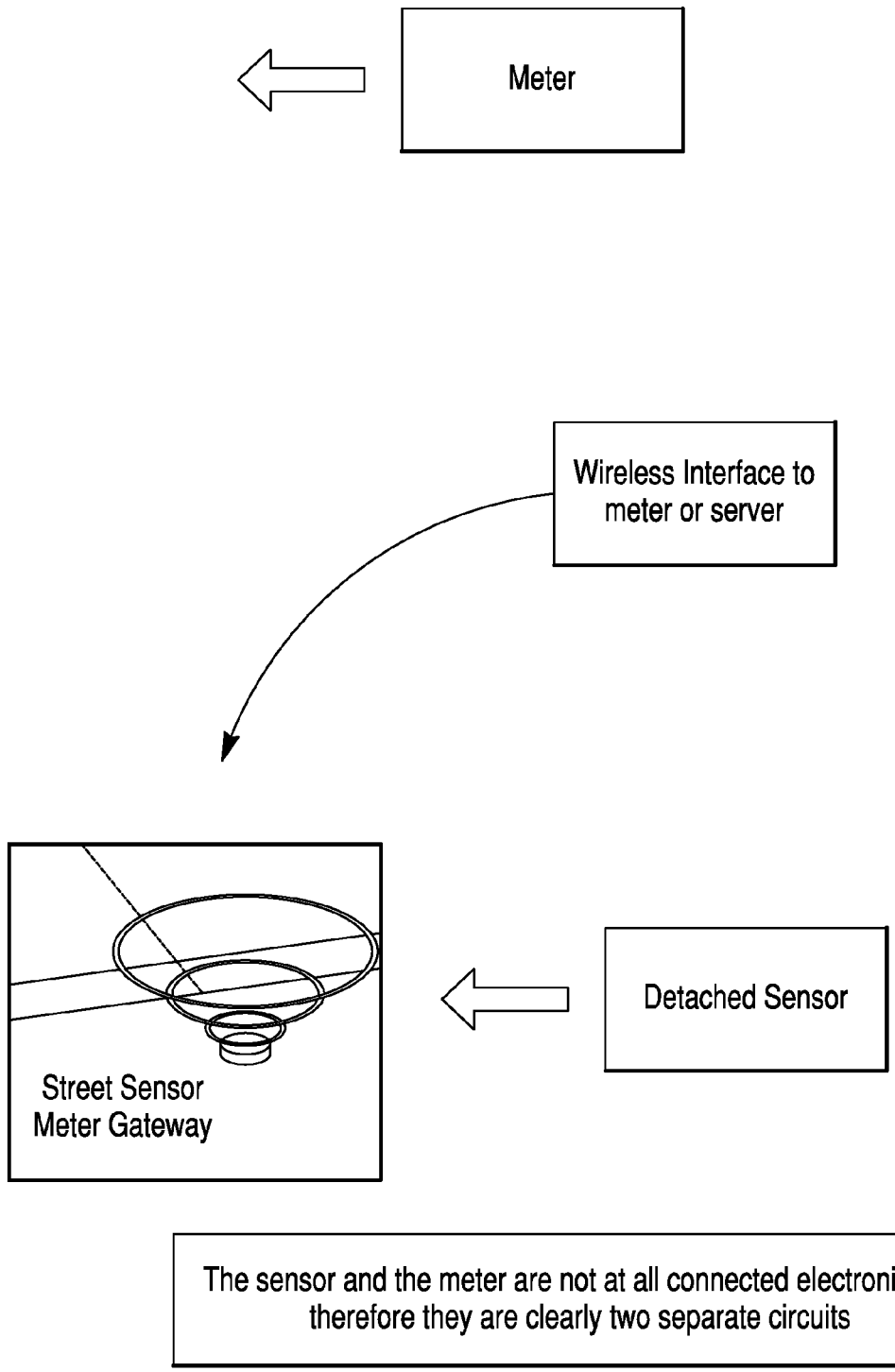

As shown in FIG. 30, the sensor unit that detects a characteristic change (e.g., of frequency and/or amplitude) of the signals that it processes. A change of one or more signal characteristics is associated with a change in status as to whether a vehicle is present or not. The sensor unit may take several readings per second. In one embodiment of the sensor unit, each new reading of the sensor unit is compared with the previous reading of the sensor unit. As shown in FIG. 30, when the sensor 30 detects a change, relative to a previous reading, of one or more signal characteristics (associated with a change of a vehicle being present to a vehicle being not present, or from a vehicle being not present to a vehicle being present), the sensor data is formatted, and the sensor data that is associated with the current status (of a vehicle being present or not) is transmitted from the sensor unit to either the payment system (e.g., a parking meter) or a remote server, as described further below. FIGS. 38-40 also show that the data associated with a vehicle being present (or absent) are transmitted from the sensor unit to either the payment system (e.g., a parking meter) or a remote server. FIGS. 41 and 42 show how the sensor circuit and the meter circuit are separate circuits, and not two logical portions of a single circuit.

Figure 31:
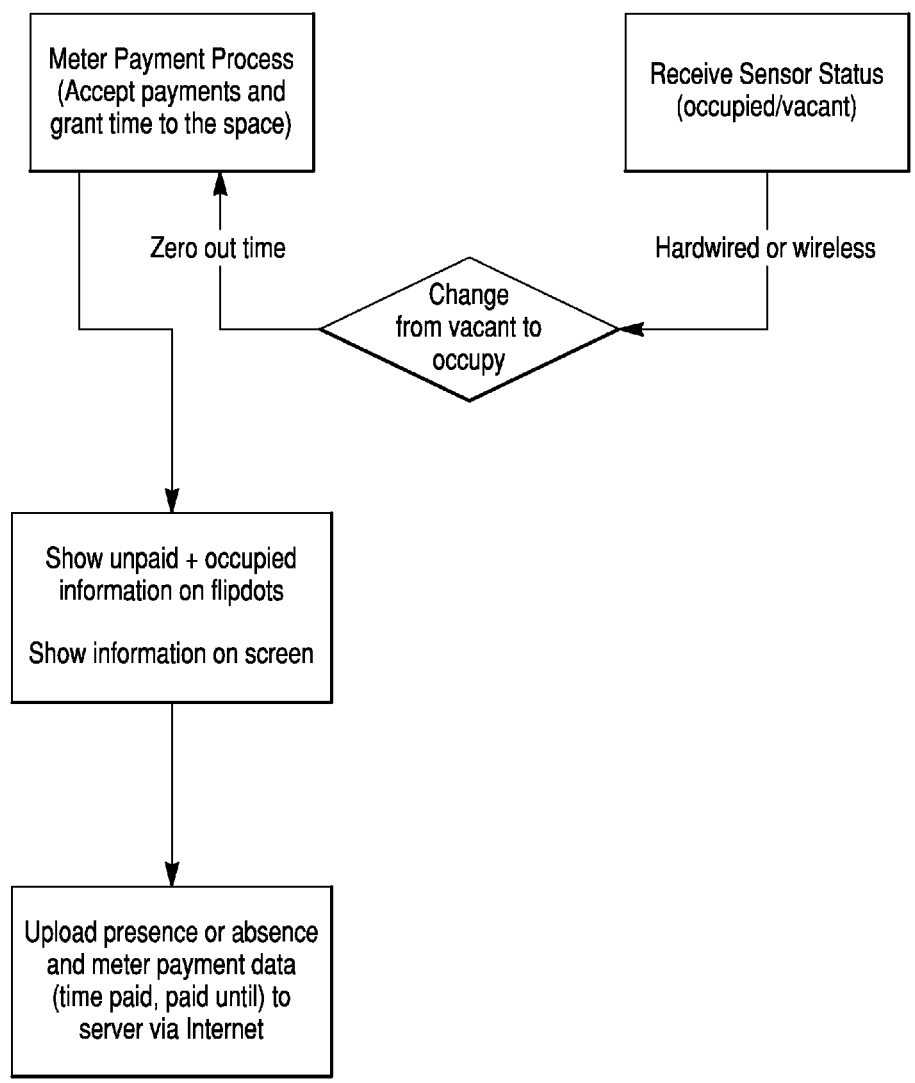
FIG. 31 shows a block diagram of the operation of a payment system (parking meter).

FIG. 31 shows a block diagram of the operation of a payment system (parking meter). As shown in the embodiment in FIG. 31, when the sensor unit detects a change in status from a parking space being vacant to being occupied, the sensor unit will zero out any time that may be remaining on a parking meter from a vehicle that was previously occupying the parking space associated with that parking meter. When the time on the meter elapses, the meter provides a visual indication that the parking space is unpaid and unoccupied. The payment system provides the visual indication apart from the sensor unit which, as described above, only detects a change in status that is associated with a change of a vehicle being present to a vehicle being not present, or from vehicle being not present to a vehicle being present. The presence indication and meter payment data are also transmitted from the parking meter to a server via the Internet. The sensor unit itself does not store data associated with a vehicle being present (or absent), and that the sensor unit is not designed for the purpose of storing the sensor data. The sensor unit is designed and intended to transmit the data indicative of a change in status to a parking meter (or to a server via the Internet in other embodiments) as fast as the sensor unit is able to do so.

Figure 32:
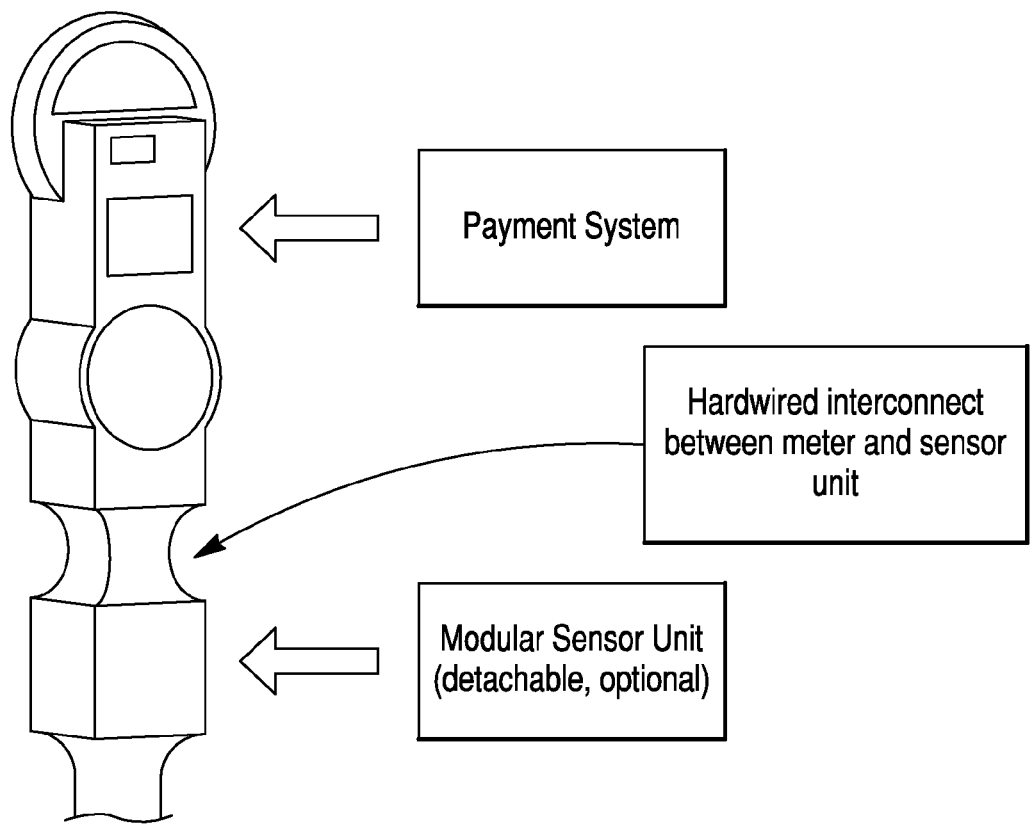
FIG. 32 shows that the sensor unit may have a hardwired interconnect to the payment system (parking meter).

FIG. 32 shows that the sensor unit may have a hardwired interconnect to the payment system (parking meter). FIG. 32 also indicates that in an optional configuration, the sensor unit can be detached from the payment system, which is the case with multi-space meters. In the hardwired interconnect embodiment, the payment system (parking meter) queries the sensor unit to obtain sensor data, and that the meter (and not the sensor unit) utilizes the sensor data to determine if there is a change in status that is associated with a change of a vehicle being present to a vehicle being not present, or from vehicle being not present to a vehicle being present. FIG. 39 shows that the sensor unit can be attached to and communicate with the payment system (parking meter), and FIGS. 38 and 40 show that the sensor unit can be detached from the payment system and communicate with a server system.

Figure 33:
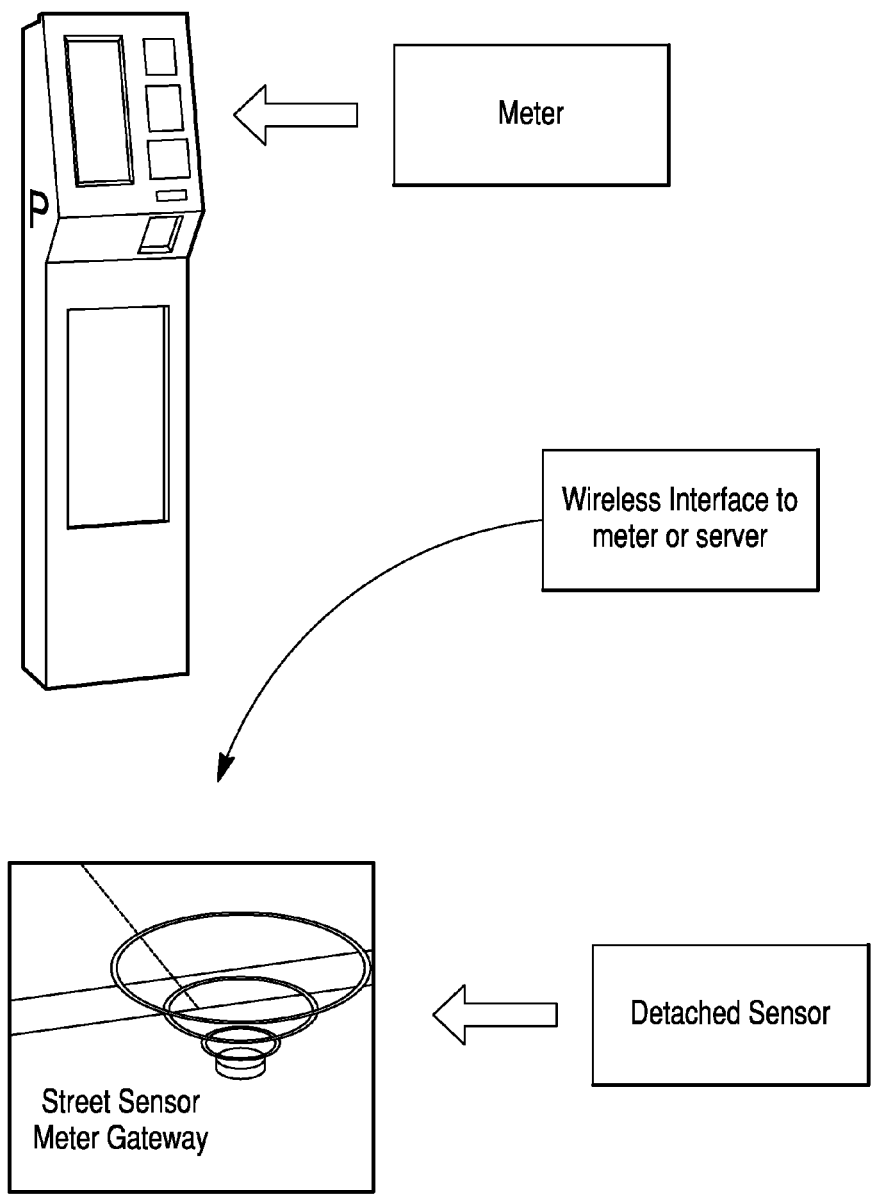
FIG. 33 shows a sensor unit that is detached from the payment system.

FIG. 33 shows a sensor unit that is detached from the payment system, and is positioned within or just below the surface of the street to detect the change in status that is associated with whether a vehicle is present or not. When the sensor unit detects a change in status, the sensor unit transmits the change of status wirelessly to the payment system or to a server by using a wireless interface to communicate with the server. In the detached sensor unit configuration, the sensor unit initiates the transmission of data associated with a change of status that is associated with whether a vehicle being present to a vehicle being not present, or from vehicle being not present to a vehicle being present, upon detecting such a change, and that the data are transmitted to and stored in the parking meter or server.

Figure 34:
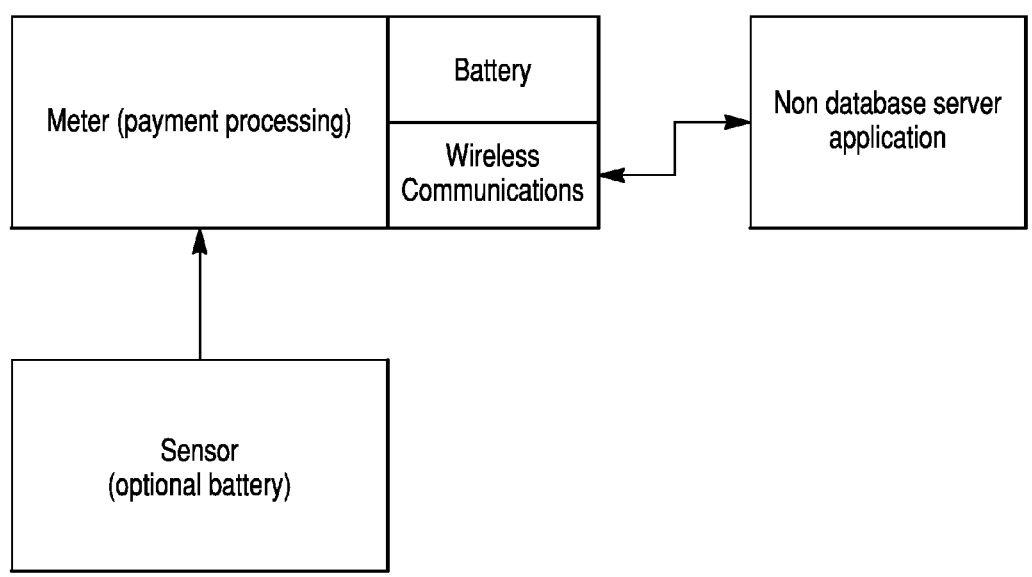
FIG. 34 illustrates a block diagram of a sensor unit that is attached to the parking meter, and generally corresponds to FIG. 32.
Figure 35:
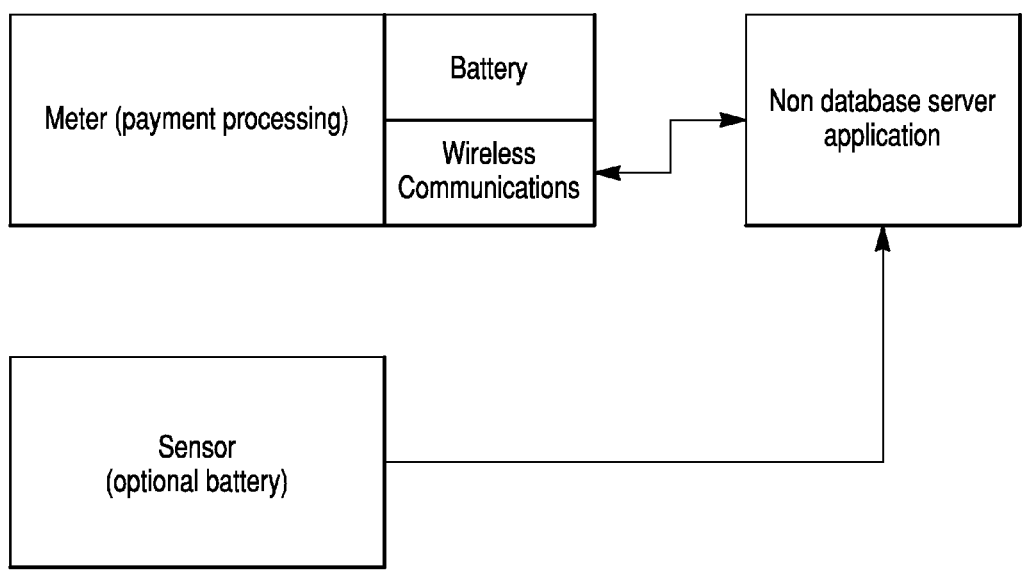
FIG. 35 illustrates a block diagram of a sensor unit that is detached from the parking meter, and generally corresponds to FIG. 33.

FIG. 34 illustrates a block diagram of a sensor unit that is attached to the parking meter, and generally corresponds to FIG. 32. FIG. 35 illustrates a block diagram of a sensor unit that is detached from the parking meter, and generally corresponds to FIG. 33.

Figure 36:
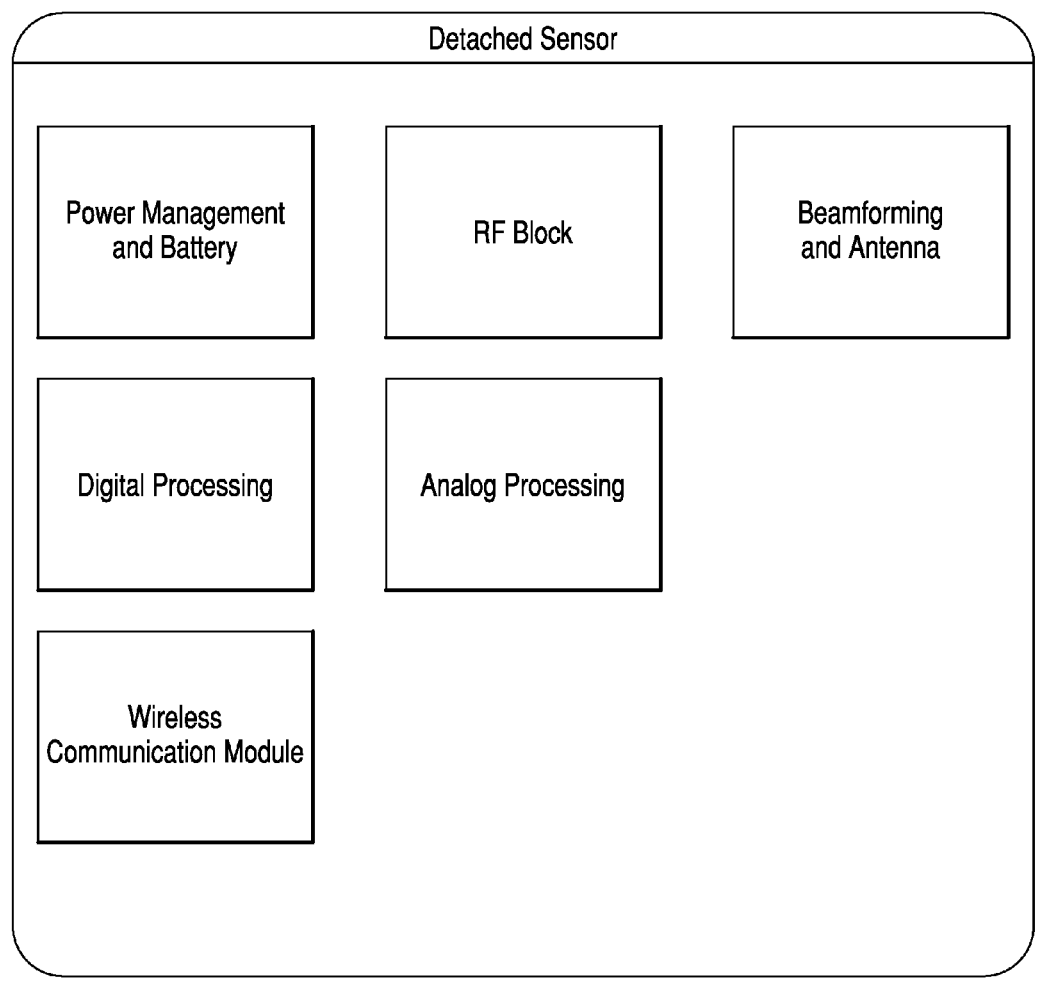
FIGS. 36 and 37 show respective sensor block diagrams of the detached sensor and the attached sensor embodiments.
Figure 37:
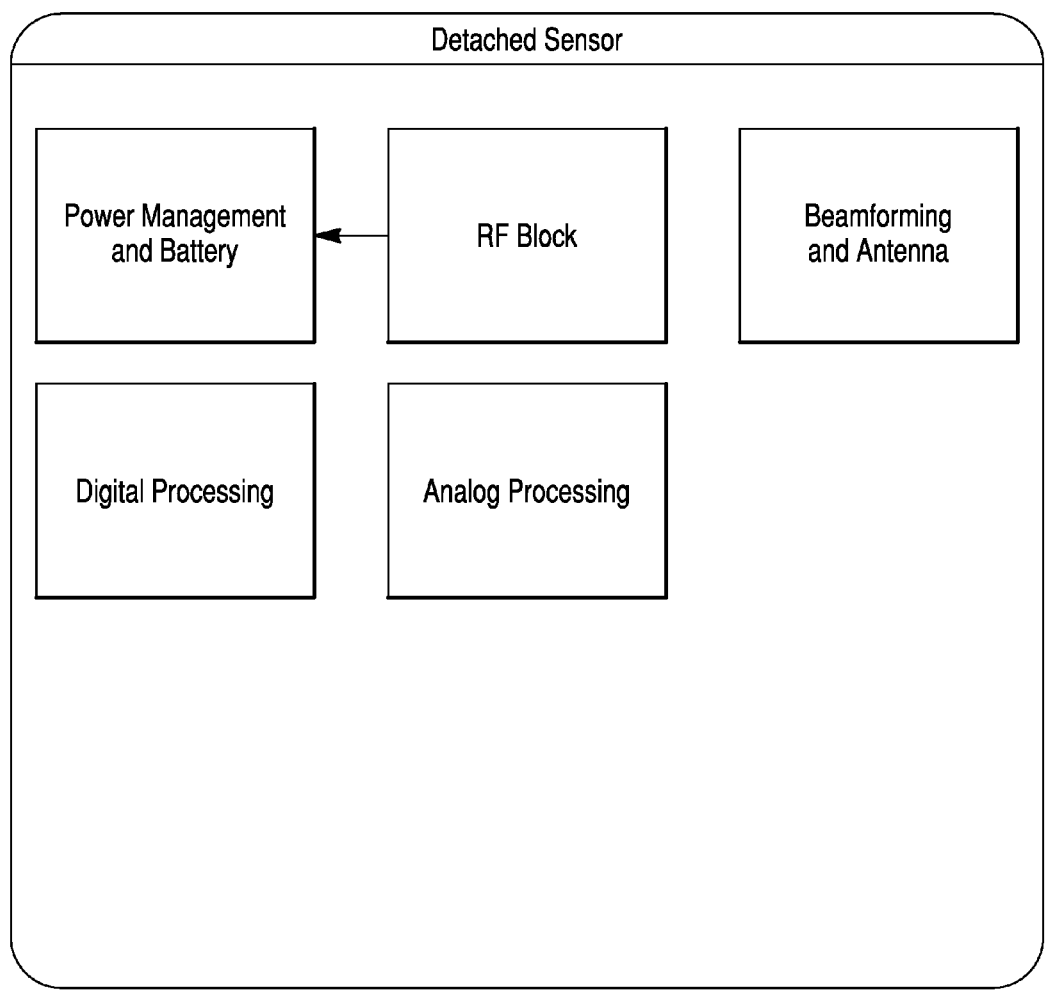

FIGS. 36 and 37 are respective sensor block diagrams of the detached sensor and the attached sensor embodiments. The detached sensor schematic (FIG. 36) differs from the attached sensor schematic (FIG. 37) in that the detached sensor schematic has a power management and battery block, whereas the attached sensor schematic only has a power management block. The attached sensor embodiment does not require a separate battery because it is powered by the same power source that is utilized by the parking meter. In addition, the detached sensor unit has a wireless communication module that allows the detached sensor unit to transmit data to the parking meter or the server, as indicated, for example, on FIG. 33. Apart from these differences, the following description of detached sensor configuration also applies to the attached sensor configuration.

As shown on FIG. 36, the detached sensor block diagram includes blocks or modules for power management and battery, RF (radio frequency), beamforming and antenna, digital processing, analog processing, and wireless communication functions. The power management and battery block is used to manage and control the power used by the detached sensor unit in order to extend the life of the battery used by the detached sensor unit. For example, the power management and battery block would ensure that the wireless communication module is not constantly transmitting to a parking meter or to the server, as such a transmission would shorten the life of the battery.

The method according to the present invention uses a directional sensor for the purposes of detecting the presence of a vehicle or an object within a zone of interest on a roadway or in a parking space. This method according to the present invention comprises the following steps:

a) transmitting a microwave transmit pulse such that a total distance occupied by the pulse in air is less than 5 feet;
b) radiating the transmitted pulse by a directional antenna system to enable the transmit pulse to be radiated preferentially towards a detection area;
c) receiving received pulses by an adjustable receive window, said receive window being precisely timed in relation to the transmit pulse with the receive window being similar or different in duration than the transmit pulse;
d) integrating or combining signals from multiple received pulses to increase a signal to noise ratio;
e) amplifying and filtering the integrated receive signal to further increase the signal to noise ratio;
f) digitizing the combined signal using an analog to digital conversion process;
g) comparing the digitized signal to at least one preset or dynamically computed threshold values to determine the presence or absence of an object in the field of view of the sensor; and
h) providing at least one pulse generator with rise and fall times of less than 3 ns each and capable of generating pulses less than 10 ns in duration for controlling the transmit pulses and receive windows.

According to the method of the present invention, at least one of the pulse repetition frequency, transmit pulse width, receive window duration, and the interval between the transmit and receive windows is adjustable using a digitally controlled circuit or under software control from a microprocessor. The receive window, according to the method of the present invention, is adjusted by software control in order to dwell on a particular receive time slice region of interest so as to increase the signal to noise ratio of the received measurement. The receive window is also kept longer than the transmit pulse duration when the roadway or parking space being monitored is vacant and when an occupancy change is detected the receive window is made smaller to more precisely range the vehicle Further according to the method of the present invention, the interval between the transmit and receive windows is continuously adjusted using an analog or digital hardware sweep circuit or under software control. Moreover, the software is programmed to adjust the interval between the transmit and receive windows to a programmatically determined zone of interest. The zone of interest is based on the expected region where a change in occupancy state will happen, including the previously measured distance of an occupying stationery vehicle, a programmed maximum distance if the detection zone was previously vacant, or a predicted zone of occupancy if a vehicle is moving.

The receive window, according to the method of the present invention, is adjusted by software control in order to dwell on a particular receive time slice region of interest so as to increase the signal to noise ratio of the received measurement.

Further according to the method of the present invention, the sensor is placed at one of (a) a location below the surface of the zone of interest, (b) a location above the surface and in contact with the zone of interest, (c) a location near the surface and adjacent to the zone of interest oriented to radiate preferentially towards the zone of interest, (d) a location on a raised fixture near the zone of interest oriented to radiate preferentially towards the zone of interest, (e) a location embedded within a parking meter or an access control device, and (f) a location embedded within a parking space number sign.

Also according to the method of the present invention, the receive window is continuously swept at a fixed or adjustable rate with respect to the transmit window in order to generate a video waveform output and optimize the detection latency and signal to noise ratio, wherein the video waveform output is digitized using an analog to digital conversion process using a circuit that is electrically coupled to the receiver and integrator and the digitized output is suitably filtered and compared to a preset or dynamically computed threshold profiles in order to discern whether there is sufficient returned signal from an object in the field of view of the sensor.

Moreover according to the method of the present invention, the transmit and receive windows are pulsed at a rate between 5 MHz and 50 MHz in order to optimize the signal to noise while ensuring compliance with regulatory limits. Also, when a change of state is determined from the returned signal, successive sets of samples are taken in quick succession to confirm or deny the first determination of change and a confidence level is computed based on the consistency in readings.

In the method according to the present invention, the filter is one of a hardware filter electrically coupled to the receiver and integrator, and a software algorithm using digitized signals. Moreover, a software or hardware envelope detector is used to extract a lower frequency profile of the received signal from a generated video.

The method according to the present invention can further comprise a mode in which the interval between the transmit and receive windows is kept fixed and the vehicle movement will result in a Doppler effect on the returned signal due to the phase shift of the returned signal in relation to the transmit and a phase coherent detection is performed returned signal phase varying in relation to the transmit pulse with vehicle movement and the resulting phase difference to combine destructively or constructively with the transmit pulse at the detector. Ranging and Doppler detection is used as corroborative data to increase the confidence of measurement, and the Doppler signal is further processed to determine whether a change in state event is an ingress or an egress event.

Further according to the method of the present invention, change in occupancy state and any of the other data elements or available in the sensor on the roadway or parking space is communicated to an external host using wired or wireless means, wherein a plurality of sensors are communicating to at least one external host using wired or wireless means forming a network of sensors that communicate with the host for the purposes of data transmission from the sensors, and configuration, monitoring and control of the sensors.

Also according to the method of the present invention, the transmit and receive windows are fully or partially overlapping in order to detect vehicles at very close distances and the transmit pulse frequency is varied by using one of (a) frequency modulating the transmit pulse (b) discrete frequency control of the transmit oscillator to generate at least two distinct frequencies and (c) incorporating a known amount of frequency noise or drift in the transmit oscillator. Also, successive ranging samples are used to determine whether there is a gradual change in object range in order to discern whether a change in state event is an ingress or an egress event and a profile of the ingress or egress is captured by multiple ranging samples, wherein the profile obtained is transmitted to an external host using wired or wireless means for storage.

Further according to the method of the present invention, the time of flight ranging is used as a low power monitoring device and the change of state determined from the received signal is used to wake one or more additional devices, such as a speed measurement device or an imaging device in order to manage the power consumption of those devices. Also, a high dielectric material is used inside or near the antenna element to enable a narrow beamwidth in a small antenna package.

Moreover, the method of the present invention further comprises a baseline profile that includes the transmit burst, initial clutter around the sensor and integrator decay so as to discern the signatures of close-in objects whose signals are mixed in with the transmit burst, initial clutter, or the integrator decay. In addition, the method of the present invention further comprises a temperature compensation of the baseline profile, including for the initial clutter, integrator decay and noise thresholds.

The foregoing description of the exemplary embodiment of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A directional sensor for the purposes of detecting a presence of a vehicle or of an object within a zone of interest on a roadway or in a parking space, comprising:
    a transmitter for transmitting a low power microwave transmit pulse such that the effective pulse width is less than 10 ns;
    a directional antenna system to enable the transmit pulse to be radiated towards a detection area;
    an adjustable receive window to receive reflected, scattered, and bounced signals of transmit pulses, the adjustable receive window being adjustable in relation to the transmit pulse;
    an integrator that performs one or more of integrating and combining signals from multiple received pulses to increase a signal to noise ratio;
    a digitizer that digitizes the integrated or combined signal from the integrator using an analog to digital conversion process;
    a module for comparing the digitized signal to at least one of preset and dynamically computed threshold values to determine the presence or absence of an object in the field of view of the sensor; and
    at least one pulse generator capable of generating at least one pulse with rise and fall times of less than 3 ns each or less than 10 ns in duration for controlling the transmit pulses and receive windows.

2. The sensor of claim 1, wherein timing of the adjustable receive window is configured to receive a reflection from a target, the reflection comprising at least one of a reflected, a scattered, and a bounced signal of an initial transmit pulse that has been reflected, scattered, or bounced from the target at least twice.

3. The sensor of claim 2, further comprising:
    a reflector structure that enhances at least one of the reflection, scattering, and bouncing of a first reflection from the target such that the signal is again reflected, scattered, and/or bounced back to the target.

4. The sensor of claim 2, wherein a first reflected, scattered, or bounced signal from the target arrives at the directional sensor during transmission of the transmit pulse.

5. The sensor of claim 1, further comprising:
a plurality of antenna elements configured to be steered to either transmit or receive signals from one or more of a plurality of detection zones.

6. The sensor of claim 5, wherein the plurality of antenna elements are used to receive at least one of a reflected, scattered, and bounced signals that have traversed a plurality of distances to a target object comprising a vehicle.

7. The sensor of claim 1, further comprising:
a controller to adjust at least one of a frequency and phase of the transmit pulse either from one burst to another or during a transmit burst.

8. The sensor of claim 1, further comprising:
a communicative coupling between the directional sensor and a payment system comprising one or more program steps to alter or remove paid time for a parking space based on a detected occupancy state change by the directional sensor.

9. The sensor of claim 1, wherein additional data is encoded in one or more of the transmit pulses and is configured for reception by one or more of a handheld and an in-vehicle device.

10. A directional sensor for the purposes of detecting a presence of a vehicle or of an object within a zone of interest on a roadway or in a parking space, comprising:
a transmitter for transmitting a low power microwave transmit pulse such that the effective pulse width is less than 10 ns;
a directional antenna system to enable the transmit pulse to be radiated towards a detection area;
a receive window to receive reflected, scattered, and bounced signals of transmit pulses, the receive window being fixed in relation to the transmit pulse;
an integrator that performs one or more of integrating and combining signals from multiple received pulses to increase a signal to noise ratio;
a digitizer that digitizes the integrated or combined signal from the integrator using an analog to digital conversion process;
a module for comparing the digitized signal to at least one of preset and dynamically computed threshold values to determine the presence or absence of an object in the field of view of the sensor; and
at least one pulse generator capable of generating at least one pulse with rise and fall times of less than 3 ns each or less than 10 ns in duration for controlling the transmit pulses and receive windows.

11. The sensor of claim 10, wherein timing of the receive window is configured to receive a reflection from a target, the reflection comprising at least one of a reflected, a scattered, and a bounced signal of an initial transmit pulse that has been reflected, scattered, or bounced from the target at least twice.

12. The sensor of claim 11, further comprising:
a reflector structure that enhances at least one of the reflection, scattering, and bouncing of a first reflection from the target such that the signal is again reflected, scattered, and/or bounced back to the target.

13. The sensor of claim 11, wherein a first reflected, scattered, or bounced signal from the target arrives at the directional sensor during transmission of the transmit pulse.

14. The sensor of claim 10, further comprising:
a plurality of antenna elements configured to be steered to either transmit or receive signals from one or more of a plurality of detection zones.

15. The sensor of claim 14, wherein the plurality of antenna elements are used to receive at least one of a reflected, scattered, and bounced signals that have traversed a plurality of distances to a target object comprising a vehicle.

16. The sensor of claim 10, further comprising:
a controller to adjust at least one of a frequency and phase of the transmit pulse either from one burst to another or during a transmit burst.

17. The sensor of claim 10, further comprising:
a communicative coupling between the directional sensor and a payment system comprising one or more program steps to alter or remove paid time for a parking space based on a detected occupancy state change by the directional sensor.

18. The sensor of claim 10, wherein additional data is encoded in one or more of the transmit pulses and is configured for reception by one or more of a handheld and an in-vehicle device.

* * * * *